(12) United States Patent
Lee et al.

(10) Patent No.: US 11,262,845 B2
(45) Date of Patent: Mar. 1, 2022

(54) DEVICE AND METHOD FOR PROVIDING VIBRATION

(71) Applicant: Samsung Electronics Co., Ltd., Gyeonggi-do (KR)

(72) Inventors: Wonjun Lee, Gyeonggi-do (KR); Minkoo Kang, Gyeonggi-do (KR); Jiwon Kim, Gyeonggi-do (KR); Won Lee, Gyeonggi-do (KR); Myojin Bang, Gyeonggi-do (KR); Sangwon Shim, Gyeonggi-do (KR); Younghak Oh, Gyeonggi-do (KR); Sunyoung Yi, Gyeonggi-do (KR); Yonggu Lee, Gyeonggi-do (KR); Kyuok Choi, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/759,796

(22) PCT Filed: Nov. 19, 2018

(86) PCT No.: PCT/KR2018/014161
§ 371 (c)(1),
(2) Date: Apr. 28, 2020

(87) PCT Pub. No.: WO2019/103413
PCT Pub. Date: May 31, 2019

(65) Prior Publication Data
US 2021/0180976 A1    Jun. 17, 2021

(30) Foreign Application Priority Data

Nov. 21, 2017 (KR) ........................ 10-2017-0155781

(51) Int. Cl.
*G06F 3/01* (2006.01)
*H04M 1/72454* (2021.01)
(Continued)

(52) U.S. Cl.
CPC ............ *G06F 3/016* (2013.01); *G06F 3/0481* (2013.01); *G06F 3/0488* (2013.01); *H04M 1/72454* (2021.01); *G01C 21/3652* (2013.01)

(58) Field of Classification Search
CPC ... G01C 21/3652; G06F 3/0488; G06F 3/016; G06F 3/04895; G06F 9/453; H04M 2250/56
See application file for complete search history.

(56) References Cited

U.S. PATENT DOCUMENTS

| | | |
|---|---|---|
| 2007/0091063 A1 | 4/2007 | Nakamura et al. |
| 2008/0122797 A1 | 5/2008 | Soh et al. |

(Continued)

FOREIGN PATENT DOCUMENTS

| | | |
|---|---|---|
| EP | 2752734 A2 | 7/2014 |
| EP | 3109736 A1 | 12/2016 |

(Continued)

OTHER PUBLICATIONS

European Search Report dated Jan. 25, 2021.
(Continued)

*Primary Examiner* — Mong-Shune Chung
(74) *Attorney, Agent, or Firm* — Cha & Reiter, LLC

(57) ABSTRACT

Various embodiments of the disclosure provide a method and apparatus for providing a vibration in an electronic device. According to various embodiments of the disclosure, an electronic device may include a memory including instructions stored therein, and at least one processor, wherein the at least one processor coupled to the memory is configured to execute the stored instructions for detecting an (Continued)

event for a user's input related to a direction, identifying a vibration pattern having directivity, in response to the detected event, and providing a vibration having directivity by driving the one or more vibration devices, based on the vibration pattern.

15 Claims, 29 Drawing Sheets

(51) Int. Cl.
*G06F 3/0481* (2022.01)
*G06F 3/0488* (2022.01)
*G01C 21/36* (2006.01)

(56) References Cited

U.S. PATENT DOCUMENTS

| | | | |
|---|---|---|---|
| 2009/0231271 | A1 | 9/2009 | Heubel et al. |
| 2009/0325647 | A1 | 12/2009 | Cho et al. |
| 2010/0238116 | A1 | 9/2010 | Shin |
| 2010/0267424 | A1* | 10/2010 | Kim ............... G06F 3/04883 455/566 |
| 2011/0234817 | A1 | 9/2011 | Sakamoto |
| 2014/0176455 | A1 | 6/2014 | Araki |
| 2014/0192247 | A1 | 7/2014 | Cheong et al. |
| 2015/0253851 | A1* | 9/2015 | Oh ............... G06F 3/04883 345/179 |
| 2015/0324646 | A1* | 11/2015 | Kimia ............... G06F 3/005 348/62 |
| 2015/0362994 | A1 | 12/2015 | Rihn et al. |
| 2016/0202764 | A1* | 7/2016 | Kamata ............... G06F 3/04883 715/702 |
| 2016/0378190 | A1* | 12/2016 | Park ............... G06F 3/016 345/173 |
| 2019/0178674 | A1* | 6/2019 | Yokoyama ............ G01C 21/30 |

FOREIGN PATENT DOCUMENTS

| | | |
|---|---|---|
| JP | 3888099 B2 | 2/2007 |
| JP | 2010-262380 A | 11/2010 |
| JP | 2011-199750 A | 10/2011 |
| JP | 6052743 B2 | 12/2016 |
| JP | 6172284 | 8/2017 |
| KR | 10-2008-0048837 A | 6/2008 |
| KR | 10-2010-0116034 A | 10/2010 |
| KR | 10-2013-0101140 A | 9/2013 |
| KR | 10-2014-0036936 A | 3/2014 |
| KR | 10-2014-0090318 A | 7/2014 |
| KR | 10-1513620 B1 | 4/2015 |
| KR | 10-2015-0104808 A | 9/2015 |
| KR | 10-2016-0039175 A | 4/2016 |
| KR | 10-1628782 B1 | 6/2016 |
| KR | 10-2016-0087340 A | 7/2016 |
| KR | 10-2017-0001186 A | 1/2017 |
| KR | 10-2017-0016695 A | 2/2017 |
| KR | 10-2017-0069936 A | 6/2017 |

OTHER PUBLICATIONS

European Search Report dated Oct. 6, 2020.
Amemiya, Tomohiro, Lead-Me Interface for a Pulling Sensation, NTT Corporation.
Nakamura, Norio; Development of Fingertip Type Non-grounding Force Feedback Display.
Korean Search Report dated Oct. 21, 2021.

* cited by examiner

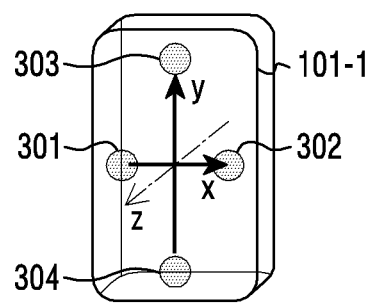
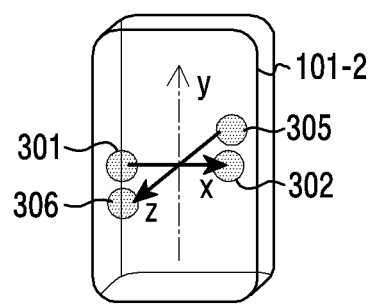
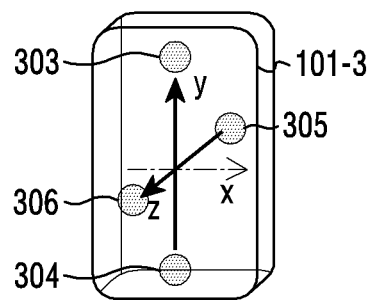
FIG.3B

DEVICE AND METHOD FOR PROVIDING VIBRATION

CROSS REFERENCE TO RELATED APPLICATIONS

This application is a National Phase Entry of PCT International Application No. PCT/KR2018/014161, which was filed on Nov. 19, 2018 and claims a priority to Korean Patent Application No. 10-2017-0155781, which was filed on Nov. 21, 2017, the contents of which are incorporated herein by reference.

TECHNICAL FIELD

Various embodiments relate to a method and electronic device for providing a vibration having directivity.

BACKGROUND ART

With the development of digital technologies, an electronic device may provide a user with rich experience. The electronic device may utilize a haptic to provide the rich experience. The haptic may mean a technique for converting an electrical signal into a mechanical stimulus recognizable by the user. The electronic device may provide the user with a tactile experience, based on the haptic. For example, in response to a user input, the electronic device may provide the mechanical stimulus to a portion in which the input is received.

DISCLOSURE OF INVENTION

Technical Problem

An electronic device may provide a mechanical stimulus (or a vibration) to a portion in which a vibration device is embedded. The provided mechanical stimulus is information on a specific point, and may be limited in providing linear or spatial information. For example, the electronic device may provide only a vibration at a specific point, and may not provide a linear vibration to a user.

Various embodiments may provide a vibration indicating linear information by using the vibration device included in the electronic device.

Various embodiments may provide a vibration having directivity by using the vibration device included in the electronic device.

Solution to Problem

In various embodiments, an electronic device may include a memory including instructions stored therein; and at least one processor. The at least one processor coupled to the memory may be configured to execute the stored instructions for detecting an event for a user's input related to a direction, identifying a vibration pattern having directivity, in response to the detected event, and providing a vibration having directivity by driving the one or more vibration devices, based on the vibration pattern.

In various embodiments, a method of an electronic device may include detecting an event for a user's input related to a direction, identifying a vibration pattern having directivity for indicating the direction, and providing a vibration having the directivity, based on the vibration pattern.

Advantageous Effects of Invention

An electronic device and an operating method thereof according to various embodiments can provide a vibration for indicating a direction.

According to various embodiments, an electronic device can induce a user to move a location of the electronic device in a direction of feeling a provided vibration.

According to various embodiments, an electronic device can induce a user to provide an input (e.g., a touch input) in a direction of feeling a provided vibration.

Advantages acquired in the disclosure are not limited to the aforementioned advantages. Other advantages not mentioned herein can be clearly understood by those skilled in the art to which the disclosure pertains from the following descriptions.

BRIEF DESCRIPTION OF DRAWINGS

FIG. 3B illustrates an example of disposing another vibration device included in an electronic device according to various embodiments;

BEST MODE FOR CARRYING OUT THE INVENTION

Figure 1A:
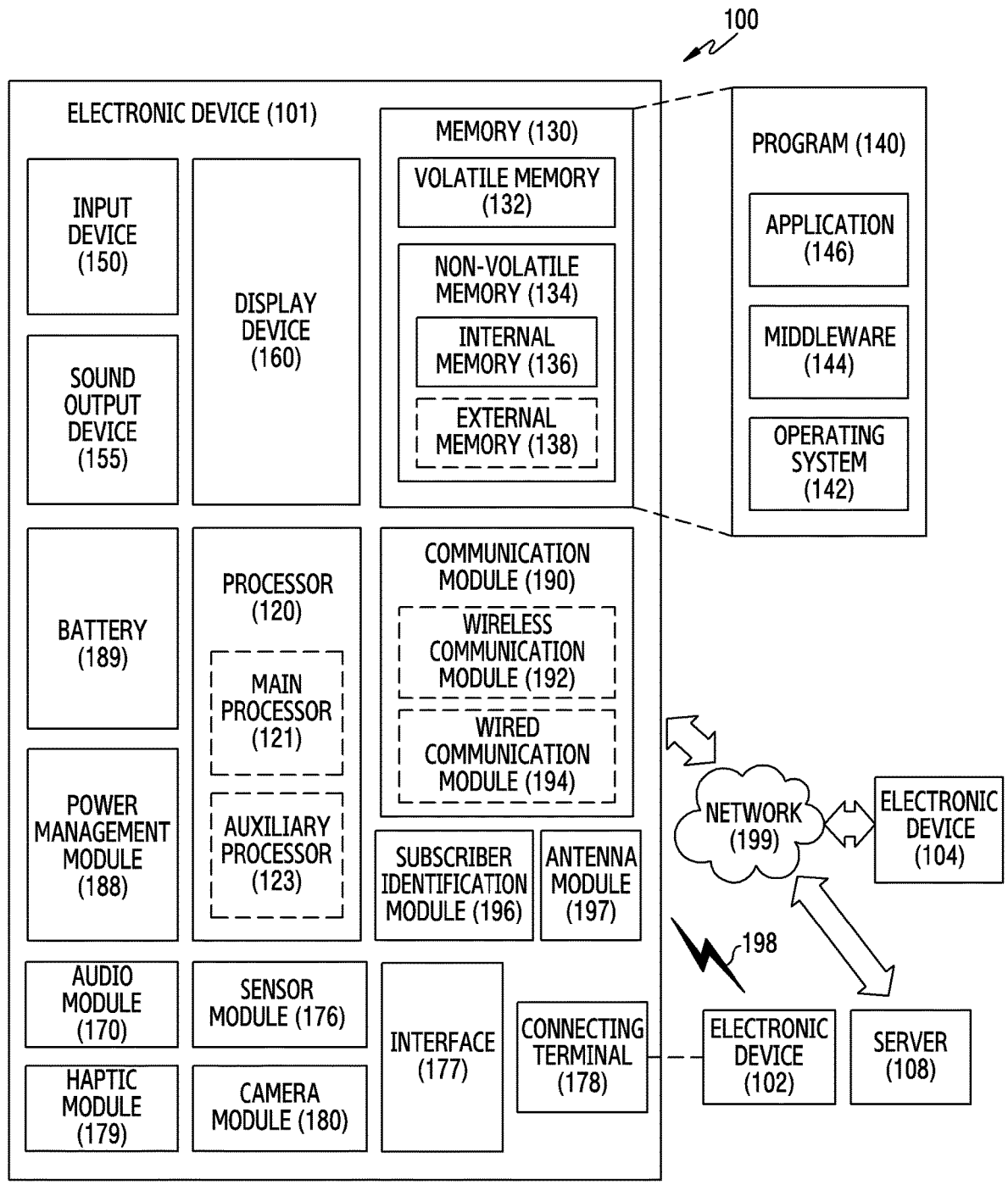
FIG. 1A is a block diagram of an electronic device in a network environment according to various embodiments.

FIG. 1A is a block diagram illustrating an electronic device 101 in a network environment 100 according to various embodiments. Referring to FIG. 1A, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, the term ' . . . module' or the like implies a unit of processing at least one function or operation, and may be implemented in hardware or software or in combination of the hardware and the software. Such a term is exemplified for convenience of explanation. Therefore, the disclosure is not limited to the terms described below, and thus other terms having the same technical meaning may also be used.

Figure 1B:
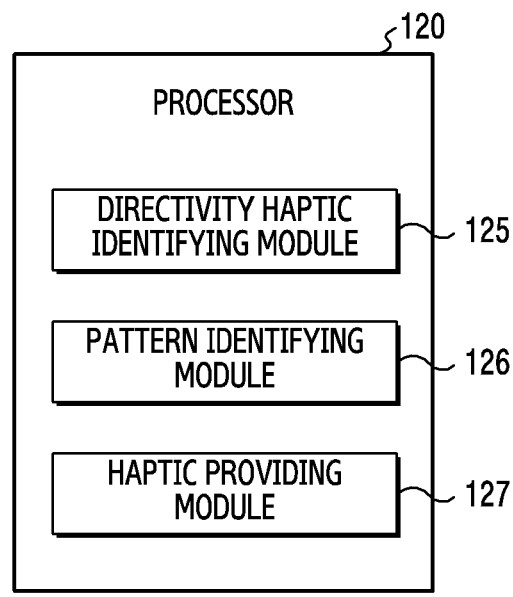
FIG. 1B illustrates an example of a functional configuration of a processor included in an electronic device according to various embodiments.

FIG. 1B illustrates an example of a functional configuration of a processor included in an electronic device according to various embodiments.

As shown in FIG. 1B, a processor 120 included in an electronic device (e.g., the electronic device 101 of FIG. 1A) according to various embodiments may include a directivity haptic identifying module 125, a pattern identifying module 126, or a haptic providing module 127.

The directivity haptic identifying module 125 may represent a module of identifying (or determining) whether an event which requires providing of a directivity haptic has occurred. In various embodiments, the directivity haptic may provide a vibration having constant directivity (or directionality). In some embodiments, the vibration having directivity may be a vibration for guiding a moving direction of the electronic device or a vibration for guiding a user's input direction. For example, the moving direction of the electronic device may be guided such that a user moves a location of the electronic device in at least one of up, down, left, and right directions, and the user's input direction may be guided such that a touch input for a display of the electronic device (e.g., the electronic device 101) is a swipe or (a drag) in at least one of up, down, left, and right directions.

The directivity haptic identifying module 125 may identify a location of the electronic device 101, a state, a type of a signal to be received, information acquired via a camera, or the like, and thus identify occurrence of an event which requires providing of a directivity haptic (or a user's input related to a direction). According to an embodiment, the directivity haptic identifying module 125 may identify a situation in which the location of the electronic device 101 is required to move in a specific direction through information acquired via a camera of the electronic device 101. For example, by identifying the information acquired via the camera, the directivity haptic identifying module 125 may determine whether the electronic device 101 has to move its location to set a focus for an object acquired via the camera. In a situation in which it is required to move the location of the electronic device 101, the directivity haptic identifying module 125 may determine that the event which requires providing of the directivity haptic has occurred.

The pattern identifying module 126 may identify (or determine) a directivity vibration pattern for driving a vibration device (e.g., the haptic module 179) for providing a directivity haptic. In various embodiments, the pattern identifying module 126 may identify the directivity vibration pattern corresponding to an event identified via the directivity haptic identifying module 125. For example, when the directivity haptic for the identified event is a vibration of a direction from right to left, the pattern identifying module 126 may determine the directivity vibration pattern for generating the vibration. Information on the directivity vibration pattern may be pre-stored in the memory 130, and the pattern identifying module 126 may determine the directivity vibration pattern for providing the directivity haptic, based on the stored information. In order to indicate a direction, the information on the directivity vibration pattern may include information on at least one of a vibration count, vibration order, vibration scheme, vibration intensity, vibration position, and vibration interval of the vibration device.

In various embodiments, the pattern identifying module 126 may provide a normal vibration, in response to a case where the identified event is an event for providing the normal vibration. If the identified event is an event irrelevant to a direction, for example, an event for switching a mode of the electronic device to a vibration mode, the pattern identifying module 126 may provide the normal vibration for vibrating the electronic device as a whole.

The haptic providing module 127 may provide a directivity haptic. In various embodiments, the haptic providing module 127 may provide the directivity haptic according to the directivity vibration pattern determined via the pattern identifying module 126. The haptic providing module 127 may control the vibration device to generate a vibration according to the determined directivity vibration pattern.

In various embodiments, the electronic device 101 may use at least one of various operating methods of the vibration device to provide a vibration. The vibration device may be driven through different operating methods according to a type. For example, the vibration device may be divided into a biased vibration device and an unbiased vibration device. The biased vibration device may include a motor capable of generating a vibration so that a force (or a tactile force) is felt as if the location of the electronic device (e.g., the electronic device 101) moves in a specific direction. The unbiased vibration device may be a motor capable of providing a vibration so that specific directivity is felt in the electronic device. For example, a magnitude of the vibration of the biased vibration device may be greater than a magnitude of the vibration of the unbiased vibration device. Accordingly, a user may feel that the vibration caused by the biased electronic device is stronger than the vibration caused by the unbiased electronic device. In various embodiments, the electronic device 101 may include one or more biased vibration devices and/or one or more unbiased vibration devices. The number of vibration devices included in the electronic device 101, an arrangement, a type of vibration to be provided, or the like may refer to FIG. 2A to FIG. 2C and/or FIG. 3A to FIG. 3C.

In various embodiments, the vibration device may be constructed of at least one of various elements capable of generating a vibration or a directivity haptic. According to embodiments, the vibration device may be referred to as a vibration motor, a vibration actuator, a vibration module, a vibration generating element, a vibration element, or the like, and the term is not limited thereto.

In various embodiments, the electronic device 101 may include the memory 130 including instructions stored therein, and at least one processor 120. The at least one processor coupled to the memory 130 may be configured to detect an event for a user's input related to a direction, identify a vibration pattern having directivity, in response to the detected event, and execute the stored instructions to provide a vibration having directivity by driving the one or more vibration devices, based on the vibration pattern.

Figure 2A:
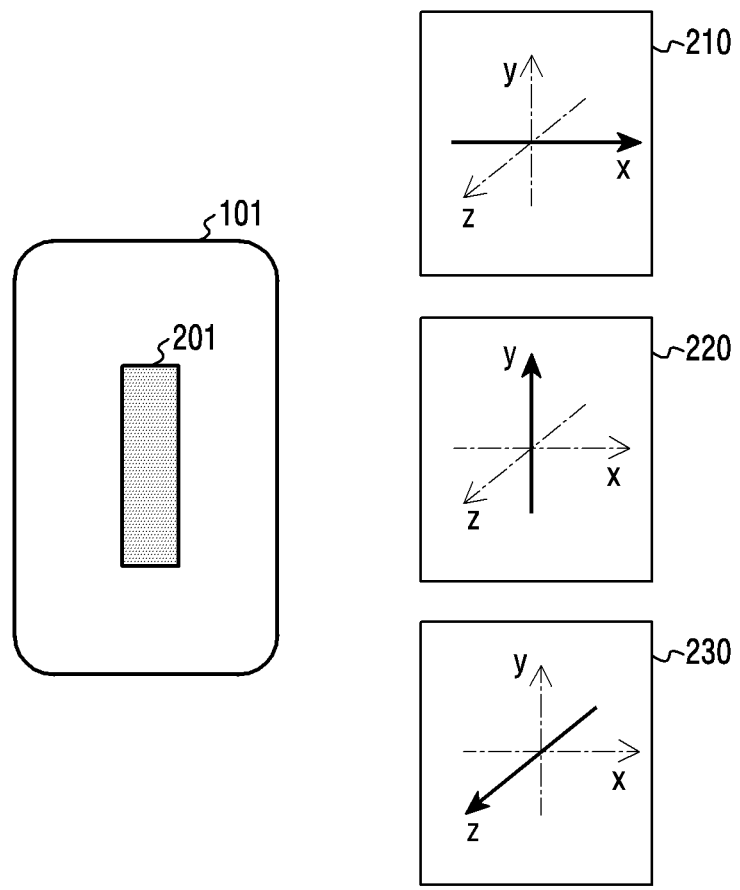
FIG. 2A illustrates an arrangement of a vibration device included in an electronic device according to various embodiments.
Figure 2B:
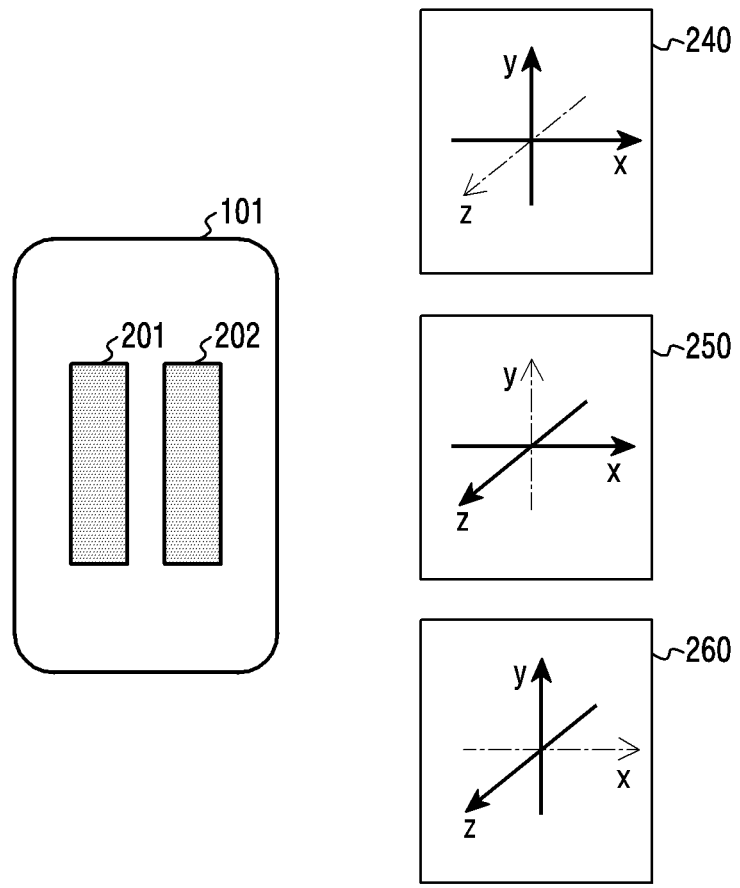
FIG. 2B illustrates an arrangement of a vibration device included in an electronic device according to various embodiments.

FIGS. 2A, 2B, and 12C illustrate an arrangement of a vibration device included in an electronic device according to various embodiments.

In various embodiments, the electronic device 101 may include a biased vibration device 201, 202, or 203. The biased vibration device may be a motor capable of generating a vibration so that a force (or a tactile force) is felt as if the electronic device is moved in a specific direction. In order to generate a vibration as if the electronic device is pushed, the biased vibration device may generate the vibration on the basis of at least one of various vibration schemes. In some embodiments, the electronic device 101 may use a vibration scheme which adjusts a movement speed of a vibrator on a linear axis. By adjusting the movement speed of the vibrator, the electronic device 101 may generate an acceleration which is biased in a specific direction. In some other embodiments, the electronic device 101 may generate an acceleration which is biased in a specific direction by utilizing a pair of rotators of which a center of mass exists outside a rotation axis. The vibration scheme of the biased vibration device is not limited to the aforementioned example, and may include various vibration schemes which allow a user to feel a pushing force.

According to various embodiments, the electronic device 101 including the biased vibration device may provide a vibration to move the electronic device 101 in a specific direction. Optionally, when the user grips the electronic device 101 or touches the electronic device 101, the user may feel a force as if the user is pushed in a specific direction by the electronic device 101.

According to various embodiments, the electronic device 101 may control a vibration intensity of the biased vibration device to provide a feeling as if a vibration point (or a vibration providing point) moves on the electronic device 101. For example, the electronic device 101 may adjust the vibration intensity of the biased vibration device to a specific intensity or less to provide the user with a feeling as if a vibration point moves on the electronic device 101.

Figure 2C:
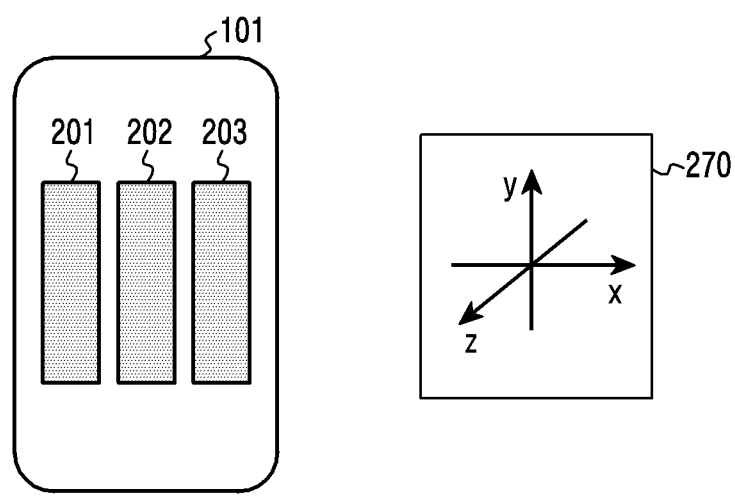
FIG. 2C illustrates an arrangement of a vibration device included in an electronic device according to various embodiments.

In various embodiments, the biased vibration device may generate a vibration for one or more axes. For example, the biased vibration device may generate a vibration for at least one of an x-axis, a y-axis, and a z-axis on a rectangular coordinate system. In FIG. 2A, FIG. 2B, or FIG. 2C described below, it is assumed that one biased vibration device generates a vibration for a single axis.

Referring to FIG. 2A, the electronic device 101 may include one biased vibration device 201. The biased vibration device 201 may be disposed at a center of the electronic device. Although not shown, the biased vibration device may be optionally disposed at an upper or lower end of the electronic device. The biased vibration device may be disposed in various manners, without being limited to the aforementioned example. FIG. 2A illustrates an example of a directivity haptic that can be provided when one biased vibration device 201 is included.

Graphs 210, 220, and 230 of FIG. 2A show examples for explaining directivity of a directivity haptic generated by the biased vibration device 201 on a rectangular coordinate system.

In various embodiments, the electronic device 101 including the first biased vibration device 201 may provide a vibration for any one of x-, y-, and z-axes. The graph 210 represents a vibration for the x-axis. The vibration for the x-axis may include a vibration of a direction from left to right and/or a vibration of a direction from right to left. For example, the vibration may be a vibration having directivity from a left bezel portion to a right bezel portion. Regarding the graph 210, a vibration that can be provided via the electronic device 101 and operations thereof may refer to FIG. 12, FIG. 14, FIG. 16, FIG. 18, FIG. 21, FIG. 22, FIG. 23, or FIG. 24 described below.

The graph 220 represents a vibration for the y-axis. The vibration for the y-axis may include a vibration of a direction from top to bottom and/or a vibration of a direction from bottom to top. For example, the vibration may be a vibration having directivity in a direction from a position at which an upper notification bar is displayed to a position at which a home button is included. Regarding the graph 220, a vibration that can be provided via the electronic device 101 and operations thereof may refer to FIG. 7, FIG. 8, and FIG. 10 described below.

The graph 230 represents a vibration for the z-axis. The vibration for the z-axis may be a vibration of a direction from a rear face of the electronic device 101 to a front face of the electronic device 101 and/or a direction from the rear face of the electronic device 101 to the front face of the electronic device 101. For example, for a user who is watching a display of the electronic device 101, the vibration may be a vibration of a direction from a position at which a display of the electronic device 101 is located to a direction at which a rear camera of the electronic device 101 is located. Regarding the graph 230, a vibration that can be provided via the electronic device 101 and operations thereof may refer to FIG. 20 described below.

Referring to FIG. 2B, the electronic device 101 may include the first biased vibration device 202 and the second biased vibration device 202. Each of the first biased vibration device 202 and the second biased vibration device 202 may generate a vibration on the basis of at least one of various vibration schemes so that a force (or a tactile force) is felt as if the electronic device is pushed. The biased vibration device 201 of FIG. 2B may be a motor corresponding to the biased vibration device 201 of FIG. 2A. The biased vibration device 202 may be a motor operating in the same or similar manner as the biased vibration device 201.

In various embodiments, the biased vibration device 201 and the biased vibration device 202 may be disposed in parallel at a center portion of the electronic device 101. Although not shown, the biased vibration device 201 and the biased vibration device 202 may be optionally disposed at an upper or lower end of the electronic device 101. The biased vibration devices may be disposed in various manners, without being limited to the aforementioned example. FIG. 2B illustrates an example of a directivity haptic that can be provided by using the two biased vibration devices 201 and 202 included in the electronic device 101.

Graphs 240, 250, and 260 of FIG. 2B show examples of a direction that can be indicated by a vibration (e.g., a directivity haptic) generated on a rectangular coordinate system by means of the first biased vibration device 202 and the second biased vibration device 202.

In various embodiments, the electronic device 101 including the first biased vibration device 202 and the second biased vibration device 202 may provide vibrations for two axes among the x-, y-, and z-axes.

In various embodiments, at least one of the two biased vibration device 201 and 202 may generate a vibration for the x-axis, and the other thereof may generate a vibration for the y-axis. Directions of the vibrations that can be provided via the electronic device 101 may refer to the graph 240. Regarding the graph 240, a vibration that can be provided via the electronic device 101 and operations thereof may refer to FIG. 7, FIG. 8, FIG. 10, FIG. 12, FIG. 14, FIG. 16, FIG. 18, FIG. 21, FIG. 22, FIG. 23, or FIG. 24 described below.

In various embodiments, when one of the two biased vibration device 201 and 202 generates a vibration for the x-axis, and the other thereof generates a vibration for the z-axis, directions of the vibrations that can be provided via the electronic device 101 may refer to the graph 250. Regarding the graph 250, a vibration that can be provided via the electronic device 101 and operations thereof may refer to FIG. 12 to FIG. 14, FIG. 16, FIG. 18, FIG. 20, FIG. 21, FIG. 22, FIG. 23, or FIG. 24 described below.

In various embodiments, when one of the two biased vibration device 201 and 202 generates a vibration for the y-axis, and the other thereof generates a vibration for the z-axis, directions of the vibrations that can be provided via the electronic device 101 may refer to the graph 260. Regarding the graph 260, a vibration that can be provided via the electronic device 101 and operations thereof may refer to FIG. 7, FIG. 8, FIG. 10, or FIG. 20 described below.

Referring to FIG. 2C, the electronic device 101 may include the first biased vibration device 202, the second biased vibration device 202, and the first biased vibration device 202. Each of the three biased vibration devices 201, 202, and 203 may generate a vibration on the basis of at least one of various vibration schemes so that a force (or a tactile force) is felt as if the electronic device is pushed. The biased vibration device 201 of FIG. 2C may be a motor corresponding to the biased vibration device 201 of FIG. 2A or the biased vibration device 201 of FIG. 2B. The biased vibration device 202 of FIG. 2C may be a motor corresponding to the biased vibration device 202 of FIG. 2B. The biased vibration device 203 may be a motor operating in the same or similar manner as the biased vibration device 201 or the biased vibration device 202.

In various embodiments, the first biased vibration device 201, the second biased vibration device 202, and the third biased vibration device 203 may be disposed in parallel at a center portion of the electronic device 101. Although not shown, the biased vibration device 201 and the biased vibration device 202 may be optionally disposed at an upper or lower end of the electronic device 101. The biased vibration devices may be disposed in various manners, without being limited to the aforementioned example. FIG. 2C illustrates an example of a directivity haptic that can be provided by using the three biased vibration devices 201, 202, and 203 included in the electronic device 101.

A graph 270 of FIG. 2C shows an example of directions that can be indicated by a vibration (e.g., a directivity haptic) generated on a rectangular coordinate system by means of the three biased vibration devices 201, 202, and 203.

Referring to FIG. 2C, the electronic device 101 may include the three biased vibration devices 201, 202, and 203. The biased vibration devices 201, 202, and 203 may generate vibrations for respective different axes. The graph 270 exemplifies a direction indicated by a vibration that can be provided via the electronic device 101. There is no restriction on a direction of the vibration provided by the electronic device 101 including the biased vibration devices 201, 202, and 203. For example, the electronic device 101 including the biased vibration devices 201, 202, and 203 may provide a vibration for any one of x-, y-, and z-axis directions.

In various embodiments, a vibration device (e.g., a biased vibration device, an unbiased vibration device) may generate a vibration in various manners. For example, the vibration device may include an element capable of generating a vibration by moving a motor when electrified. For another example, the vibration device may include an element capable of generating a vibration in such a manner that an electroactive polymer having a shrinking property is used when electrified.

Figure 3A:
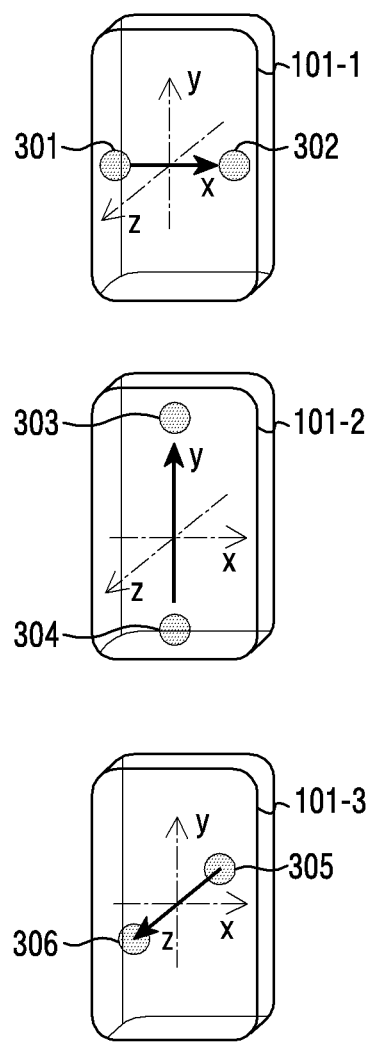
FIG. 3A illustrates an example of disposing another vibration device included in an electronic device according to various embodiments.
Figure 3C:
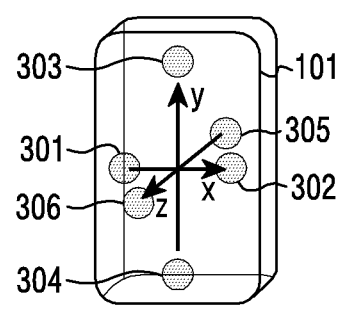
FIG. 3C illustrates an example of disposing another vibration device included in an electronic device according to various embodiments.

FIGS. 3A, 3B, and 3C illustrate an example of disposing another vibration device included in an electronic device according to various embodiments.

In various embodiments, the electronic device 101 may include an unbiased vibration device (e.g., unbiased vibration devices 301 to 306). The unbiased vibration devices are disposed in pair on a single axis to generate a vibration of a direction of the single axis. For example, two unbiased vibration devices may be disposed at different positions on an x-axis of a rectangular coordinate system to generate a vibration of a direction for the x-axis.

In various embodiments, the unbiased vibration device may generate a vibration to provide a feeling as if a vibration point moves on an electronic device (e.g., the electronic device 101). In an embodiment, the electronic device 101 may individually adjust vibration intensities of a plurality of vibrators in order to generate vibrations as if the vibration point moves. Each of the plurality of vibrators individually generates a vibration of a different frequency to provide a different vibration for each portion of the electronic device 101. In other words, the electronic device 101 may individually change vibration intensities of the plurality of vibrators included in the electronic device 101 to use a vibration scheme for changing a vibration distribution of the electronic device 101.

In various embodiments, the electronic device 101 may control a vibration intensity of an unbiased vibration device to provide a vibration as if the electronic device 101 is pushed. For example, the electronic device 101 may increase the vibration intensity of the unbiased vibration device to at least a specific intensity to provide a vibration as if the electronic device 101 is pushed in a specific direction.

Hereinafter, FIG. 3A to FIG. 3C may explain at least one direction indicated by a directivity haptic that can be provided by the electronic device 101, 101-1, 101-2, or 101-3 through each of axes (x-, y-, and z-axes), based on a rectangular coordinate system. In various embodiments, the x-axis may refer to a path of a vibration having left or right directivity (e.g., a horizontal direction), the y-axis may refer to a path of a vibration having upward or downward directivity (e.g., a vertical direction), or the z-axis may refer to a path of a vibration having forward or backward directivity.

Referring to FIG. 3A, the electronic device 101-1, 101-2, or 101-3 includes two unbiased vibration devices disposed on a single axis. The electronic device 101-1 (e.g., the electronic device 101) may include the two unbiased vibration devices (or one pair of unbiased vibration devices) 301 and 302 disposed on the x-axis. The electronic device 101-1 may provide a vibration for the x-axis via the two unbiased vibration devices disposed on the x-axis. In an embodiment, the electronic device 101-1 may provide a vibration of a direction from left to right (or from right to left) on a display. The electronic device 101-1 provides the vibration to induce a user's touch input which is a swipe (or drag) from left to right.

In various embodiments, the electronic device 101-2 (e.g., the electronic device 101) may include the two unbiased vibration devices (or one pair of unbiased vibration devices) 303 and 304 disposed on the y-axis. The electronic device 101-2 may provide a vibration for the y-axis via the two unbiased vibration devices disposed on the y-axis. In an embodiment, the electronic device 101-2 may provide a vibration of a direction from top to bottom (or from bottom to top) on a display via the two unbiased vibration devices disposed on the y-axis to induce a user's touch input which is a swipe from top to bottom.

In various embodiments, the electronic device 101-3 (e.g., the electronic device 101) may include the two unbiased vibration devices (or one pair of unbiased vibration devices) 305 and 306 disposed on the z-axis. For example, the unbiased vibration device 306 may be disposed to a display portion of the electronic device 101-3, and the unbiased vibration device 305 may be disposed to a rear portion of the electronic device 101-3. In an embodiment, the electronic device 101-3 may adjust intensities of the two unbiased vibration devices disposed on the z-axis to provide a vibration as if the electronic device 101-3 is pushed forward or backward.

Referring to FIG. 3B, the electronic device 101-1, 101-2, or 101-3 may include four unbiased vibration devices disposed in pair at different positions on two axes. In various embodiments, the electronic device 101-1 (e.g., the electronic device 101) may include the two unbiased vibration devices 301 and 302 disposed on the x-axis and the two unbiased vibration devices 303 and 304 disposed on the y-axis. In an embodiment, the electronic device 101-1 may provide a vibration in an x-axis direction or y-axis direction on the display.

In various embodiments, the electronic device 101-2 (e.g., the electronic device 101) may include the two unbiased vibration devices 301 and 302 disposed on the x-axis and the two unbiased vibration devices 305 and 306 disposed on the z-axis. In an embodiment, the electronic device 101-2 may provide a vibration in an x-axis direction or z-axis direction on the display.

In various embodiments, the electronic device 101-2 (e.g., the electronic device 101) may include the two unbiased vibration devices 303 and 304 disposed on the y-axis and the two unbiased vibration devices 305 and 306 disposed on the z-axis. In an embodiment, the electronic device 101-2 may provide a vibration in a y-axis direction or z-axis direction on the display.

Referring to FIG. 3C, the electronic device 101-1, 101-2, or 101-3 may include six unbiased vibration devices disposed in pair at different positions on three axes.

In various embodiments, the electronic device 101 may include the two unbiased vibration devices 301 and 302 disposed on the x-axis, the two unbiased vibration devices 303 and 304 disposed on the y-axis, and the two unbiased vibration devices 305 and 306 disposed on the z-axes. There is no restriction on a direction of a vibration provided by the electronic device 101 including the unbiased vibration devices 301 to 306 disposed on the x-axis, y-axis, and z-axis.

The unbiased vibration devices 301 to 306 of FIG. 3A, FIG. 3B, or FIG. 3C may be identical except for locations at which the devices are disposed.

Figure 4:
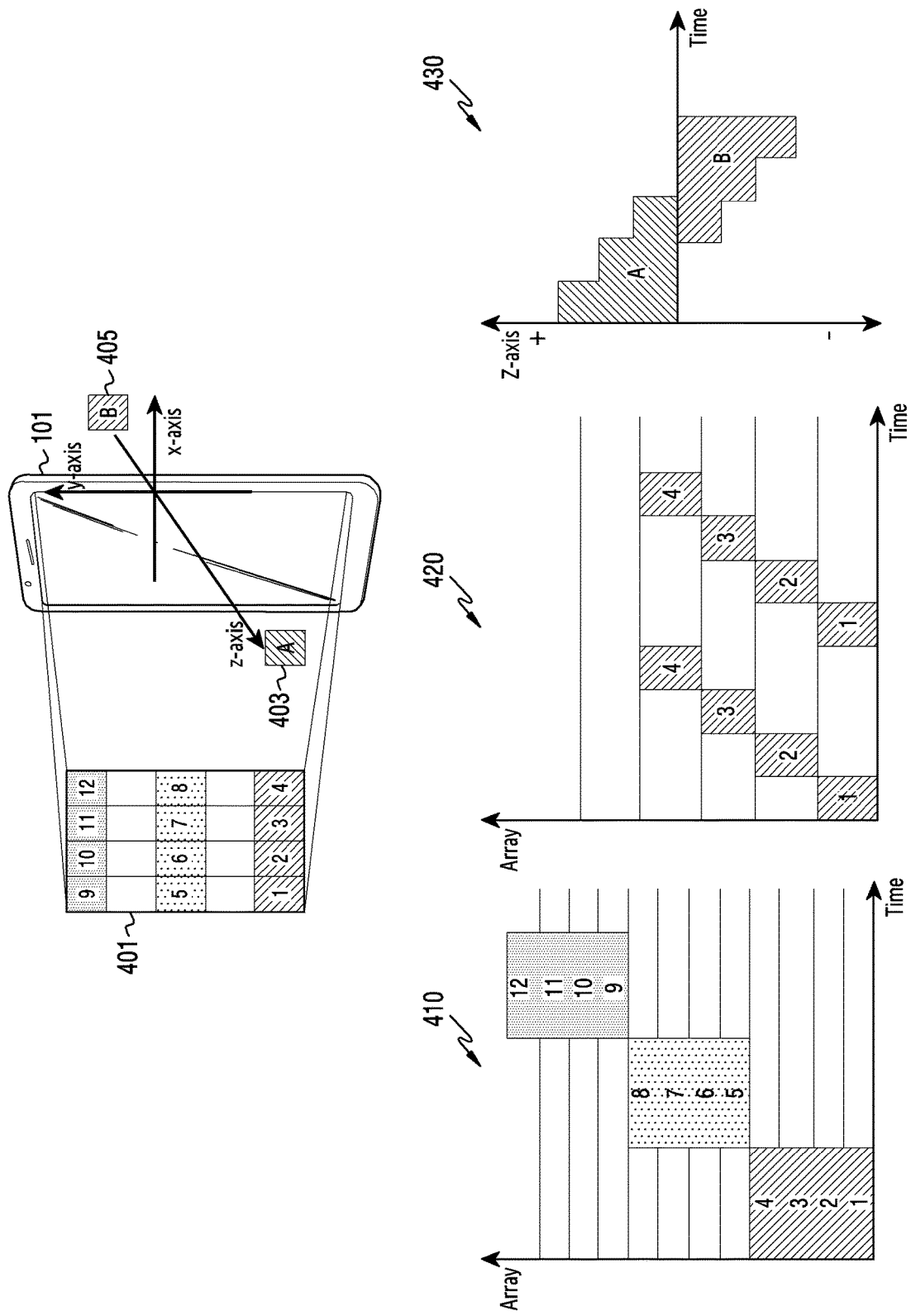
FIG. 4 illustrates an example of a directivity vibration pattern of a directivity haptic according to various embodiments.

FIG. 4 illustrates an example of a pattern of a directivity haptic according to various embodiments. The pattern of the directivity haptic may include a pattern of a vibration provided via the electronic device 101.

Referring to FIG. 4, the electronic device 101 may include a vibration array 401 in the entire region of the display device 160. In various embodiments, according to the vibration array 401, the electronic device 101 may include 12 parts in which a vibration is provided. Parts 1 to 4 of the vibration array 401 may be a lower portion of the electronic device 101. Parts 5 to 8 of the vibration array 401 may be a center portion of the electronic device 101. Parts 9 to 12 of the vibration array 401 may be an upper portion of the electronic device 101. A part A 403 may be a portion for a front face of the electronic device 101, and a part B 405 may be a portion for a rear face of the electronic device 101. For example, the part A may include a portion of a display of the electronic device 101, and the part B may include a portion of the rear face (or back face).

A graph 410 shows an example of a directivity vibration pattern for providing a vibration of a direction from bottom to top of the electronic device. A vibration may be provided to a lower portion, that is, the parts 1 to 4, of the vibration array 401 for the same time period, and a vibration (e.g., a vertical vibration) may be provided sequentially to a center portion (e.g., parts 5 to 8) and an upper portion (e.g., parts 9 to 12). In this case, the electronic device 101 may provide a directivity haptic of a direction from bottom to top.

In various embodiments, the electronic device 101 may adjust a type of the vibration device included therein or an intensity of the vibration device to provide a directivity haptic of a different type even if it has the same pattern. For example, the electronic device 101 may use a biased vibration device to provide a vibration (e.g., a directivity haptic, or a haptic) as if the electronic device 101 is pushed from bottom to top. For another example, the electronic device 101 may control the biased vibration device to operate with a pre-designated intensity or less. Accordingly, the electronic device 101 may provide a vibration (e.g., a directivity haptic, a haptic, or a vertical vibration) causing a feeling as if a vibration point moves from bottom to top. For another example, the electronic device 101 may use the unbiased vibration device to provide a vibration (e.g., a directivity haptic or a haptic) causing a feeling as if the vibration point moves from bottom to top.

A graph 420 shows an example of a directivity vibration pattern for a lower portion of the electronic device 101. The electronic device 101 may provide a vibration sequentially from the part 1 to the part 4. In this case, a user of the electronic device 101 may provide a vibration (e.g., a horizontal vibration) of a direction from a left side of the electronic device 101 to a right side of the electronic device 101. The graph 420 may provide a vibration of a direction from the part 1 to the part 4 two times to provide a vibration of a direction from left to right two times.

A graph 430 shows an example of a directivity vibration pattern for a z-axis portion of the electronic device 101. The electronic device 101 may increase an intensity of a vibration for a part B while gradually decreasing an intensity of a vibration for a part A. The electronic device 101 may decrease the intensity of the vibration of the part A in a form of stairs, i.e., with a specific time period (or a specific time interval). The electronic device 101 may increase the intensity of the vibration for the part B with a specific time period (or a specific time interval).

Although not shown, in various embodiments, each part of the vibration array 401 may include one vibration device (a biased vibration device or an unbiased vibration device). The electronic device 101 may control vibration devices for respective parts to provide a pattern of a directivity haptic. In some other embodiments, the electronic device 101 including one vibration device may control the vibration device to control each part. By controlling each part, the electronic device 101 may provide the pattern of the directivity haptic.

Figure 5:
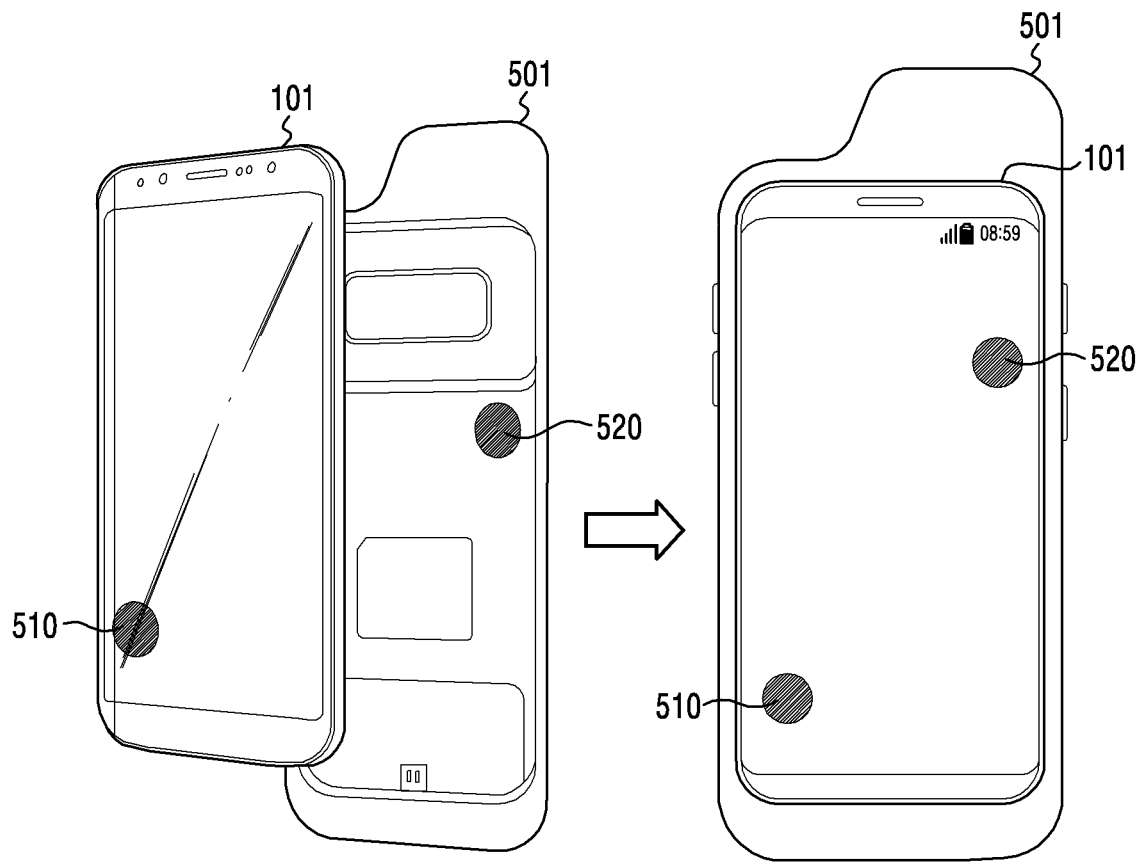
FIG. 5 illustrates an example of an operation related to another electronic device including a vibration device according to various embodiments.

FIG. 5 illustrates an example of an operation related to another electronic device including a vibration device according to various embodiments. The vibration device may include a biased vibration device or an unbiased vibration device.

Referring to FIG. 5, the electronic device 101 may include a vibration device 510 at a lower left portion. An accessory 501 (e.g., a mobile case) configured to be combinable with the electronic device 101 may include a vibration device 520 at an upper right portion. Locations at which the vibration devices 510 and 520 are disposed are not limited to the aforementioned example, and thus the vibration devices may be disposed at various locations at which a directivity haptic can be provided.

In various embodiments, the electronic device 101 may be combined (or connected) with the accessory 501. The electronic device 101 may operate the vibration device 520 included in the accessory 501, based on the combining with the accessory 501. For example, the electronic device 101 may interwork with the accessory 501 or control the accessory 501, based on the combining with the accessory 501. For example, the electronic device 101 may control the vibration device 520 included in the accessory 501.

In various embodiments, the electronic device 101 may provide a directivity haptic by controlling the vibration device 510 and/or the vibration device 520 to generate a vibration. For example, the electronic device 101 combined with the accessory 501 may sequentially operate the vibration device 510 and the vibration device 520 to provide a vibration (or a directivity haptic) of a direction from left to right.

Hereinafter, an operating method will be described according to various embodiments of the disclosure with reference to the accompanying drawings. However, since the various embodiments of the disclosure are not restricted or limited by the content described below, it should be noted that the disclosure is applicable to the various embodiments on the basis of embodiments described below. A hardware-based approach is described for example in the various embodiments of the disclosure described hereinafter. However, since the various embodiments of the disclosure include a technique in which hardware and software are both used, a software-based approach is not excluded in the embodiments of the disclosure.

Figure 6:
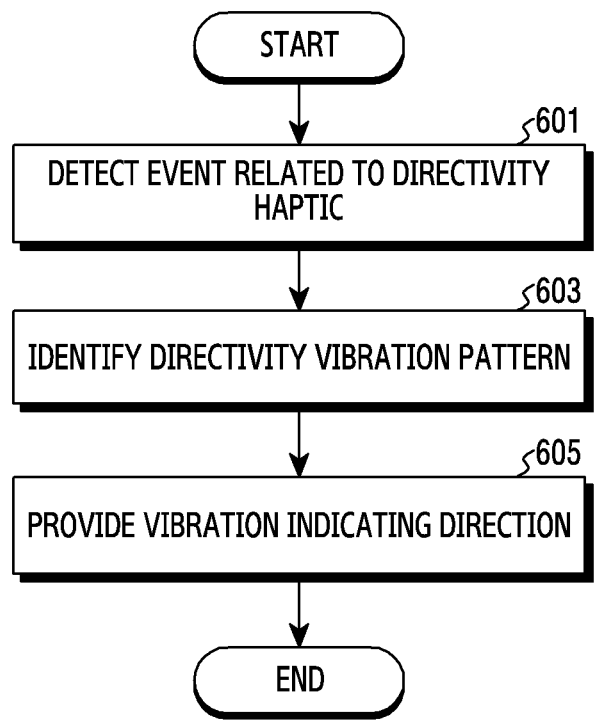
FIG. 6 illustrates an example of an operation of an electronic device for providing a vibration having directivity according to various embodiments.

FIG. 6 illustrates an example of an operation of an electronic device for providing a vibration having directivity according to various embodiments.

In operation 601, the processor 120 may detect an event related to a directivity haptic (or a directivity haptic event). In various embodiments, the directivity haptic may include a vibration for inducing a user who grips the electronic device 101 to feel a force as if the user is pushed in a specific direction or to provide an input in a specific direction on a display. The directivity haptic may be a vibration for informing the user of information related to a direction. The directivity haptic may be a vibration for informing that an input in a specific direction is required.

In various embodiments, the directivity haptic event may be a situation pre-configured (pre-stored or pre-designated) to provide a directivity haptic. In some embodiments, information on the directivity haptic event may be pre-stored in a database related to the electronic device 101. For example, the directivity haptic event may be designated as a case where a location of the electronic device 101 is a shop, a case where a home screen is executed, or a case where an alarm is executed. Information thereon may be pre-stored in the electronic device 101. In some other embodiments, the directivity haptic event may be configured by a user of the electronic device 101. For example, the user may configure a configuration menu of a navigation application to guide a location on the basis of the directivity haptic. In this case, the directivity haptic event may include a case where the navigation application is executed.

In various embodiments, the directivity haptic event may be pre-mapped to the directivity haptic. In the presence of a plurality of directivity haptic events, a directivity haptic corresponding to each of the directivity haptic event may be pre-mapped.

In various embodiments, the processor 120 may identify the directivity haptic event. The processor 120 may determine (or identify) a direction of an input related to the directivity haptic event. Based on the identification, the processor 120 may determine a directivity haptic for indicating the determined direction of the input.

In various embodiments, the directivity haptic event may include a situation in which a user's input, i.e., a swipe of a specific direction, is required. For example, the directivity haptic event may include a situation in which a home screen requiring a user's input, i.e., a swipe from right to left, is executed.

In various embodiments, the directivity haptic event may include a situation in which the electronic device 101 has to move in a specific direction. For example, the directivity haptic event may be a situation in which the electronic device 101 has to move in a direction of approaching an object so that the object included in a preview image is in focus. The processor 120 may identify the preview image and a location of the electronic device 101 to identify whether the directivity haptic event occurs.

In various embodiments, the processor 120 may identify at least one of the location of the electronic device 101, a state of the electronic device 101, information received in the electronic device 101, a date, a time, and a screen displayed in the electronic device 101. Based on the identified information, the processor 120 may identify (or detect) the directivity haptic event. For example, if the location of the electronic device 101 is identified as a shop, the processor 120 may determine the directivity haptic event is detected. In this case, a required directivity haptic may be a directivity haptic of a direction from bottom to top.

In various embodiments, each directivity haptic event may have a designated directivity haptic corresponding thereto. For example, if executing of a home screen is designated as the directivity haptic event, the directivity haptic may be a vibration causing a feeling as if a vibration point moves from right to left. For another example, if receiving of a message is designated as the directivity haptic event, the directivity haptic may be a vibration causing a feeling as if the vibration point moves from top to bottom.

In operation 603, the processor 120 may identify a pattern of the directivity haptic. In various embodiments, the pattern of the directivity haptic may be a directivity vibration pattern of a vibration device. The processor 120 may identify the directivity vibration pattern of the vibration device for providing the directivity haptic. In an embodiment, the directivity haptic corresponding to the directivity haptic event may be a vibration of a direction from bottom to top. The processor 120 may identify the directivity vibration pattern of the vibration device for providing a vibration of a direction from bottom to top. Descriptions regarding the vibration device or the directivity vibration pattern may refer to FIG. 2A to FIG. 5.

In various embodiments, information on a directivity vibration pattern of the vibration device for providing a specific directivity haptic may be pre-stored. For example, the directivity vibration pattern of the vibration device for providing the directivity haptic of a direction from bottom to top may be pre-stored as information corresponding to the graph 410 of FIG. 4. Content related to the directivity vibration pattern of the vibration device may refer to FIG. 4.

In operation 605, the processor 120 may provide a directivity haptic (or a vibration having directivity) by using the identified directivity vibration pattern. In various embodiments, the processor 120 may operate the vibration device on the basis of the directivity vibration pattern identified through operation 603 to provide the directivity haptic. For example, the processor 120 may operate the vibration device according to the identified directivity vibration pattern to provide the directivity haptic.

Figure 7:
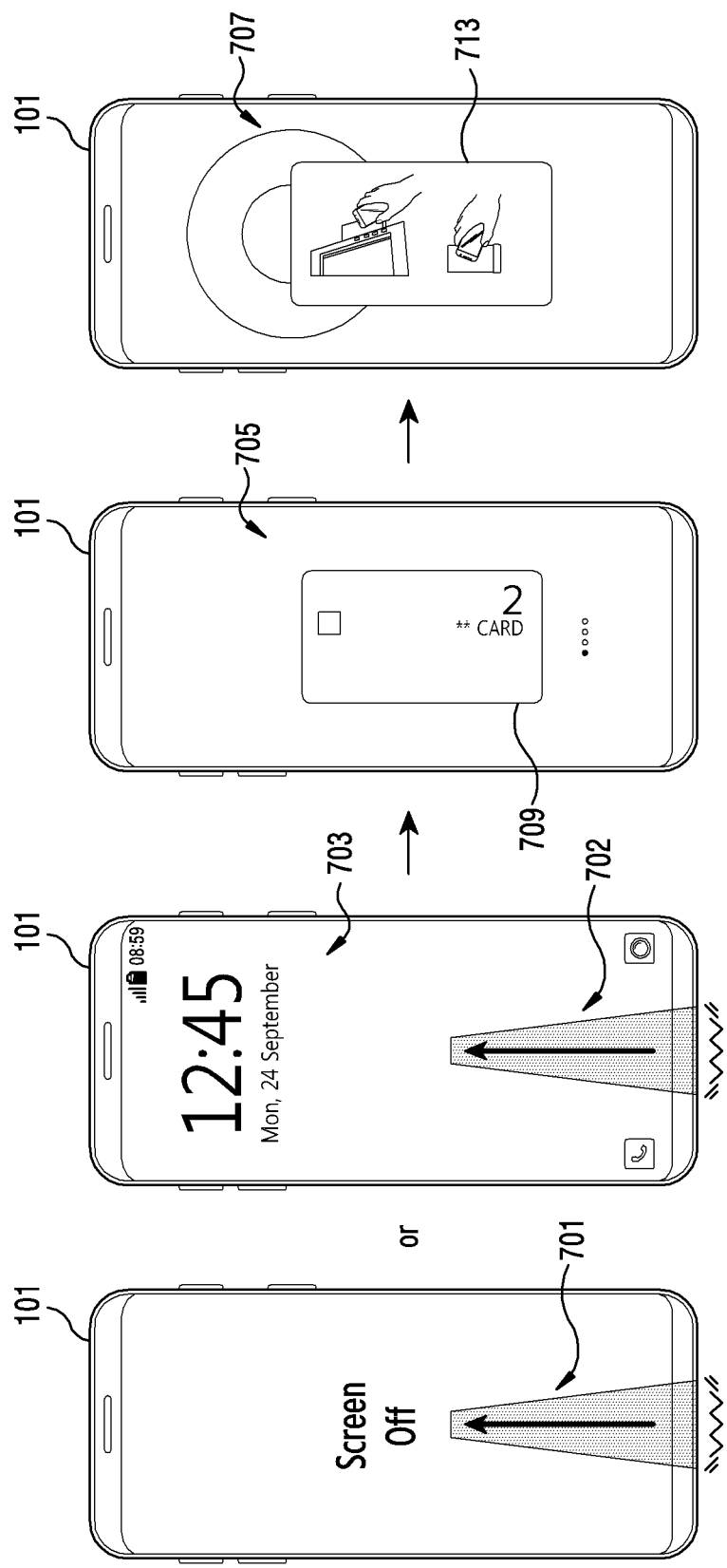
FIG. 7 illustrates an example of a user interface displayed in an electronic device for providing a vibration having directivity according to various embodiments.

FIG. 7 illustrates an example of a User Interface (UI) displayed in an electronic device for providing a vibration having directivity according to various embodiments.

Referring to FIG. 7, when a screen of the electronic device 101 is in an off-state, the processor 120 may provide a directivity haptic 701, in response to detecting of a directivity haptic event. For example, the directivity haptic event may be a case where the electronic device 101 is placed at a predetermined location. For another example, the directivity haptic event may be a case where a payment request signal is received from a payment device related to a shop. For another example, the directivity haptic event may include a case where a payment is requested on an Internet browser. The directivity haptic 701 may include a vibration having directivity in a direction from bottom to top. The directivity haptic 701 may be a vibration capable of providing a feeling as if a vibration point moves.

In various embodiments, in a state where a UI 703 indicating a home screen of the electronic device 101 is displayed, the processor 120 may provide a directivity haptic 702, in response to detecting of a directivity haptic event. The directivity haptic event may include, for example, a case where a point (e.g., a shop location) predetermined by a user of the electronic device 101 is identified as being within a specific distance (e.g., 50 m). For another example, the directivity haptic event may include a case where a designated signal is received through a Global Positioning System (GPS) or Bluetooth. The directivity haptic 702 may correspond to the directivity haptic 701.

Although not shown, in various embodiments, the processor 120 may identify whether the payment is requested on the Internet browser (herein, whether the payment is requested on the Internet browser may correspond to the directivity haptic event). When the payment is requested on the Internet browser, the processor 120 may provide the directivity haptic indicating a direction from bottom to top.

In various embodiments, the processor 120 may receive a user's input for a direction indicated by the directivity haptic 701 or the directivity haptic 702. The received user's input may be a user's touch input which is a swipe from bottom to top. In response to receiving of the user's input, the processor 120 may display a UI 705 for determining a payment means. The UI 705 may include at least one (e.g., a payment means 709) of payment means pre-registered by a user. In an embodiment, the payment means 709 may include a payment means preferred by the user or a payment means related to the directivity haptic event. For example, if the directivity haptic event is for a shop, the payment means 709 may be a payment means that can be used in the shop. For another example, if the directivity haptic event is for the shop, the payment means 709 may be a payment means recommended to be used in the shop.

In various embodiments, the processor 120 may display a UI 707, in response to detecting of a user's input for the payment means 709. The UI 707 may be a user interface for indicating entering a state for payment, or for guiding a payment method. The UI 707 may display content for indicating entering the state for payment. For example, the UI 707 may display content 713 indicating the payment method.

Figure 8:
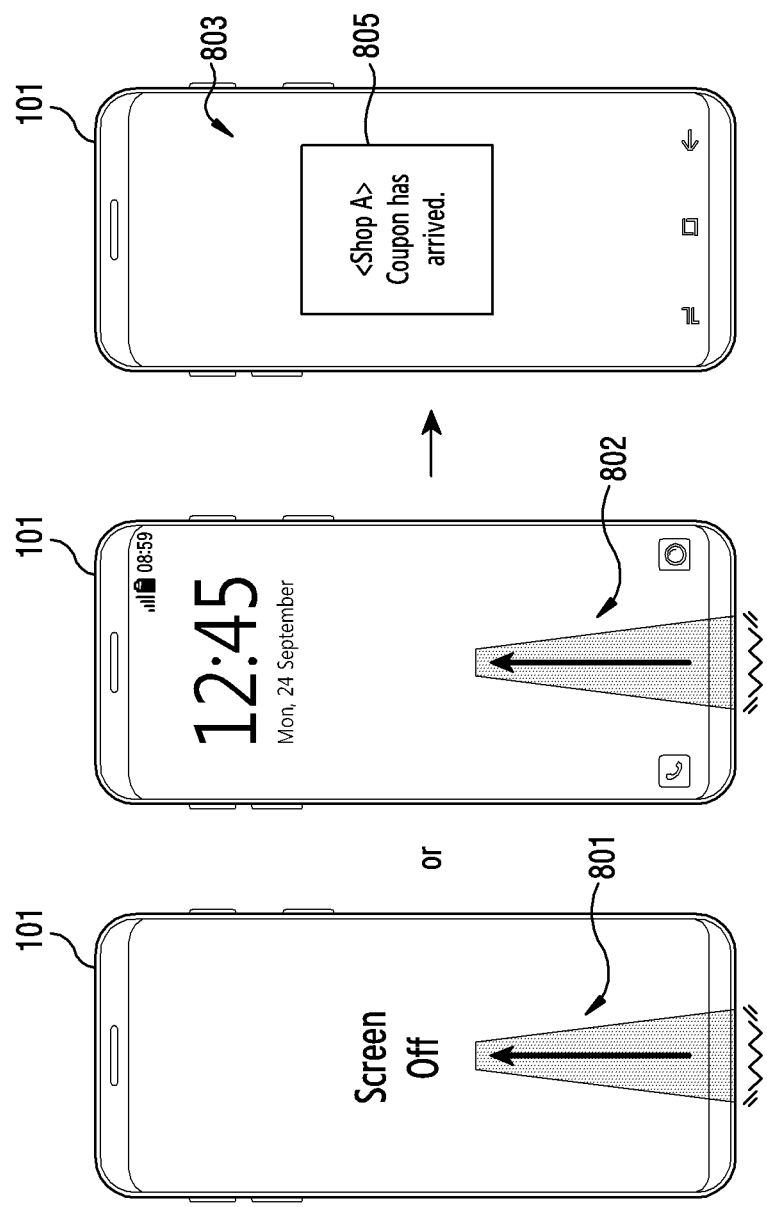
FIG. 8 illustrates another example of a user interface displayed in an electronic device for providing a vibration having directivity according to various embodiments.

FIG. 8 illustrates another example of a user interface displayed in an electronic device for providing a vibration having directivity according to various embodiments.

Referring to FIG. 8, the processor 120 may provide a directivity haptic 801 or 802, in response to detecting of a directivity haptic event. In various embodiments, the directivity haptic 801 may correspond to the directivity haptic 701 of FIG. 7, and the directivity haptic 802 may correspond to the directivity haptic 702 of FIG. 7. Hereinafter, content overlapping with FIG. 7 may be omitted.

In various embodiments, the directivity haptic event may be a case where a specific signal is detected based on Near Field Communication (NFC). For example, the directivity haptic event may include a case where a signal indicating coupon information is received from a device related to a nearby store. The processor 120 may identify a directivity haptic related to displaying of the coupon. For example, the processor 120 may identify that the directivity haptic of a direction from bottom to top is required. The processor 120 may provide the directivity haptic, based on a pre-designated pattern. Descriptions regarding the pattern for providing the directivity haptic may refer to FIG. 2A to FIG. 5.

In various embodiments, if the processor 120 receives a user's input related to the directivity haptic, the processor 120 may display information related to the directivity haptic event. For example, if the processor 120 receives a swipe (or drag) input of a direction from bottom to top, the processor 120 may display information 805 of the received coupon in a direction from bottom to top.

Figure 9:
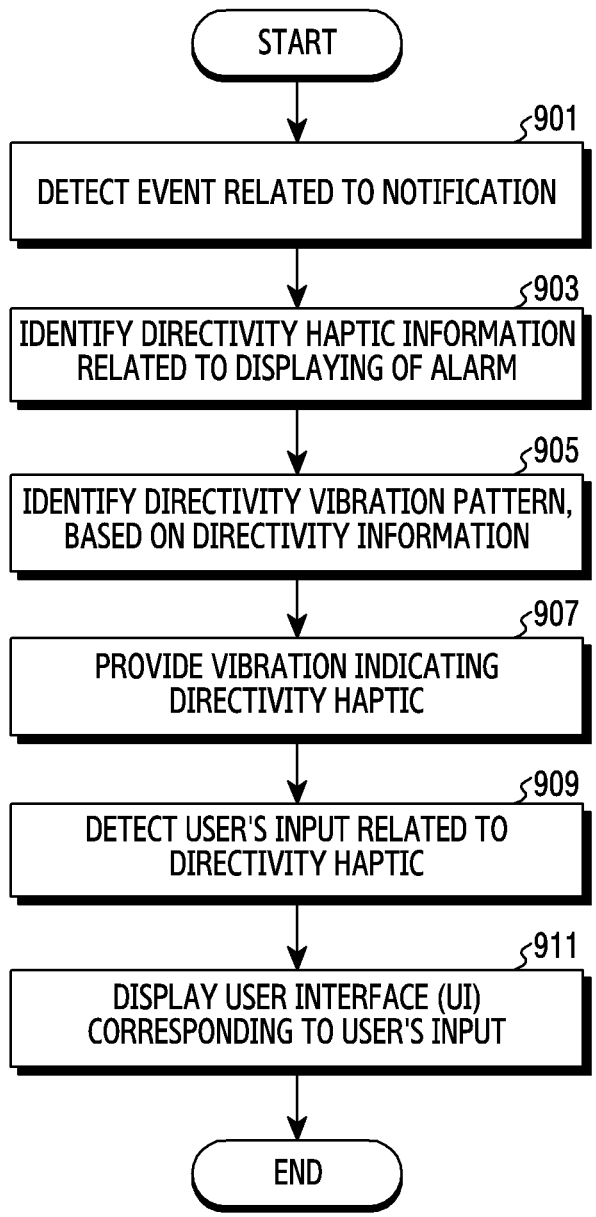
FIG. 9 illustrates another example of an operation of an electronic device for providing a vibration having directivity related to a notification according to various embodiments.

FIG. 9 illustrates another example of an operation of an electronic device for providing a vibration having directivity according to various embodiments.

Referring to FIG. 9, in operation 901, the processor 120 may detect an event related to a notification. The event related to the notification may be pre-designated. For example, the event related to the notification may include a case where a message is received through a message application.

In operation 903, the processor 120 may identify directivity information related to displaying of the notification. The directivity information may include at least one of a direction of a user input and whether a user input having directivity is required to display the notification. The directivity information may include a variety of information for identifying whether the event related to the notification is related to directivity, and is not limited to the aforementioned example.

In various embodiments, the directivity information related to displaying of the notification may be mapped to the event related to the notification and may be stored in the memory 130 of the electronic device 101. For example, if the event related to the notification is receiving of a message, the directivity information may include information on a user's input required to display the received message or information indicating that the required user input is a vertical direction. The processor 120 may detect the event related to the notification to identify the mapped directivity information.

In operation 905, the processor 120 may identify a directivity vibration pattern, based on the directivity information. The directivity vibration pattern may be a pattern by which a vibration device included in the electronic device 101 operates. The processor 120 may identify the directivity vibration pattern of the vibration device for providing a directivity haptic indicating the direction, based on the directivity information. Descriptions regarding the vibration device or the directivity vibration pattern may refer to FIG. 2A to FIG. 5.

In operation 907, the processor 120 may provide a directivity haptic by using the directivity vibration pattern. The processor 120 may provide the directivity haptic by controlling the vibration device to operate in response to the directivity vibration pattern.

In operation 909, the processor 120 may detect the user's input related to the directivity haptic. In an embodiment, the processor 120 may detect a user's swipe (or drag) input corresponding to a provided vibration direction related to the directivity haptic. For example, if the provided directivity haptic is a vibration of a direction from top to bottom, the processor 120 may detect a swipe input provided by a user in a direction from top to bottom.

In operation 911, the processor 120 may display a UI corresponding to a user's input. The processor 120 may execute a function of the electronic device 101 corresponding to the user's input, in response to receiving of the user's input. For example, the processor 120 may expand a notification bar at an upper end, in response to receiving of a user's input of a direction from top to bottom.

Figure 10:
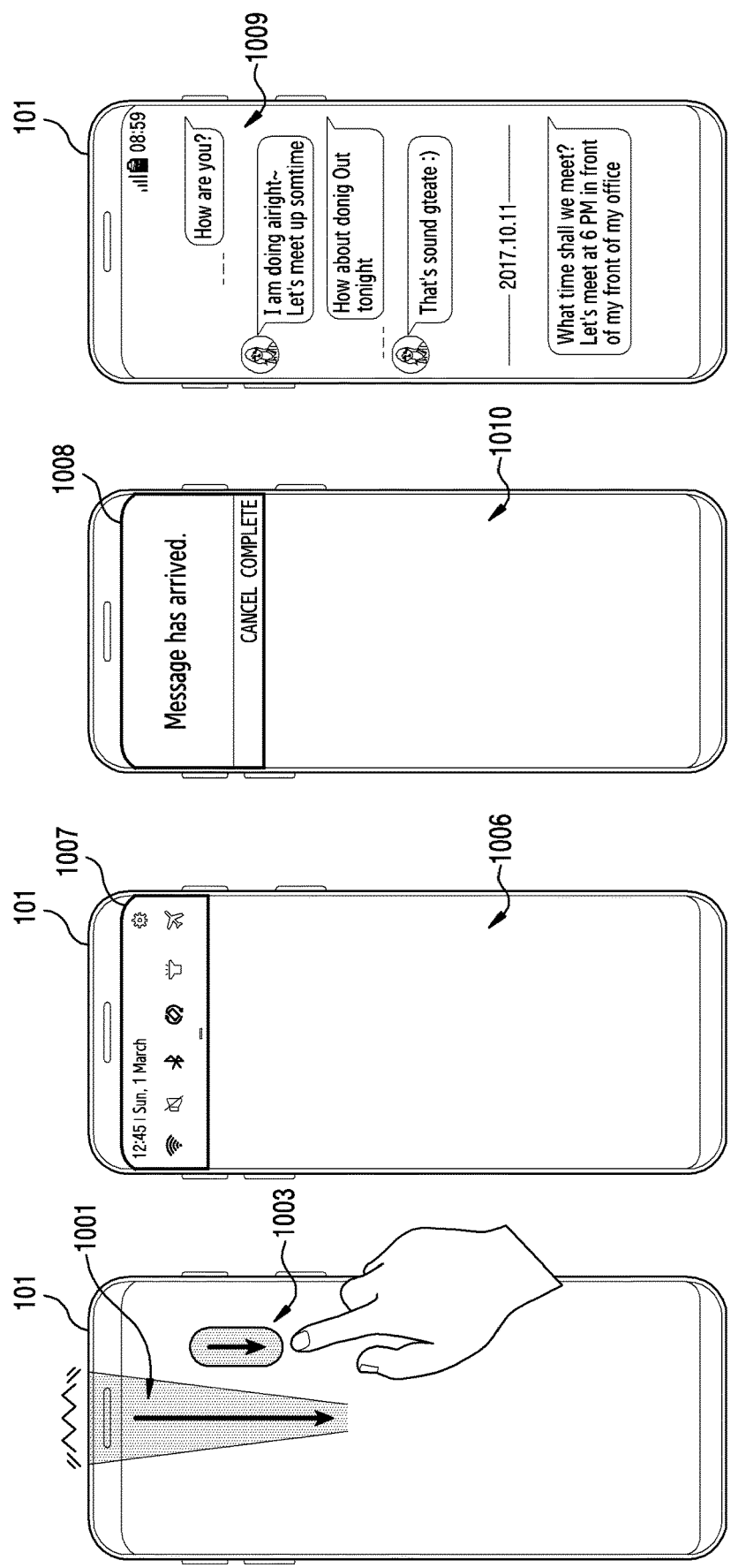
FIG. 10 illustrates an example of a user interface of an electronic device for providing a vibration having directivity related to a notification according to various embodiments.

FIG. 10 illustrates an example of a user interface of an electronic device for providing a vibration having directivity related to a notification according to various embodiments.

Referring to FIG. 10, upon detecting an event related to a notification, the processor 120 may provide a directivity haptic 1001 related to the notification. The directivity haptic 1001 may be provided in a state where a user interface is displayed or in an inactive state 101 (e.g., a screen-off state).

In various embodiments, the processor 120 may identify whether it is required to provide the notification through a quick panel 1007. The notification through a quick panel 1007 may be, for example, a notification indicating that Wi-Fi is connected through a Wi-Fi icon included in the quick panel. In this case, the processor 120 may identify whether the Wi-Fi is connected, and thus may determine whether it is required to provide the notification through the quick panel 1007.

In various embodiments, the processor 120 may identify whether there is a notification not identified by a user. The processor 120 may provide the directivity haptic 1001 for displaying at least one unidentified notification 1005. In some embodiments, upon identifying that at least a specific number of notifications not identified by the user (or unidentified notifications) are accumulated, the processor 120 may provide the directivity haptic 1001

In various embodiments, the processor 120 may detect an input 1003 related to the directivity haptic 1001. The input 1003 may include a swipe input of a direction indicated by the directivity haptic. In some embodiments, the processor 120 may display the quick panel 1007 at an upper portion of a UI 1006, in response to detecting of the input 1003. In some other embodiments, the processor 120 may display an unidentified notification 1008 at an upper portion of a UI 1010, in response to detecting of the input 1003. The unidentified notification 1008 may include, for example, a text for indicating receiving of a message.

In various embodiments, the processor 120 may detect a user's input for the unidentified notification 1008. The processor 120 may execute an application of the unidentified notification 1008, in response to detecting of the user's input for the unidentified notification 1008. The user's input may be, for example, a touch input for a 'COMPLETE' icon included in the unidentified notification 1008. The processor 120 may display details of the unidentified notification 1008 by executing the application. A UI 1009 may include the details of the unidentified notification 1008. For example, if the unidentified notification 1008 is a message, content of the message or a message log with respect to another electronic device which has transmitted the message may be displayed.

Although not shown, in various embodiments, after the directivity haptic is provided, upon detecting another directivity haptic event related to another directivity haptic, the processor 120 may provide an additional vibration. The directivity haptic may be provided sequentially according to a time point of the detected event.

Figure 11:
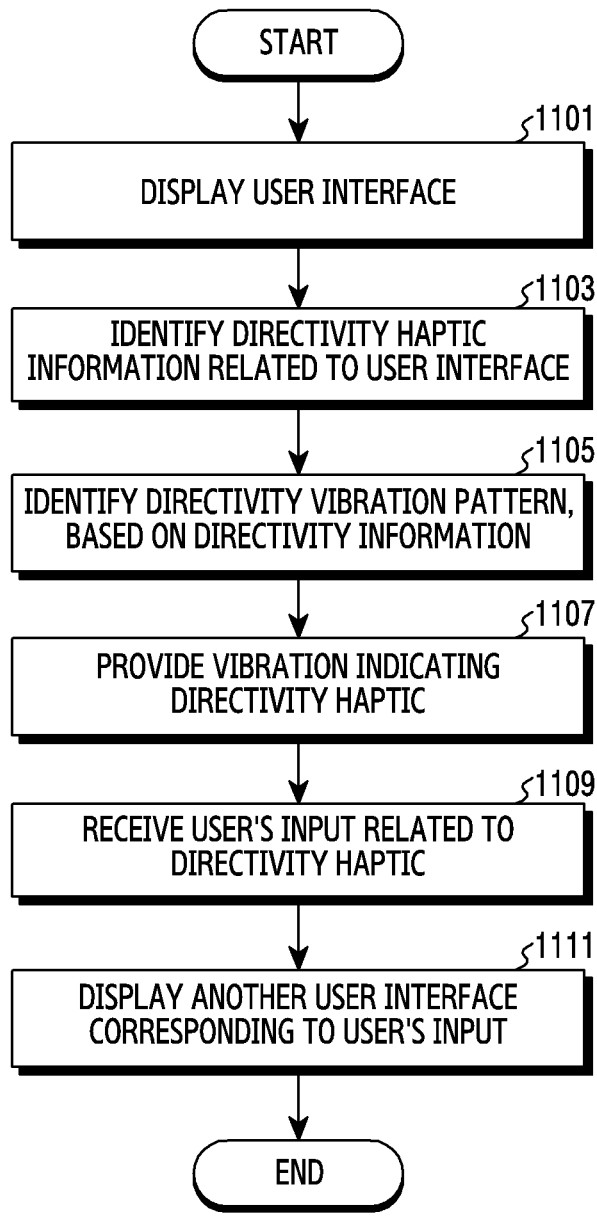
FIG. 11 illustrates an example of an operation of an electronic device for providing a vibration having directivity related to a user interface according to various embodiments.

FIG. 11 illustrates an example of an operation of an electronic device for providing a vibration having directivity related to a user interface according to various embodiments.

Referring to FIG. 11, in operation 1101, the processor 120 may display a user interface. When an application (or an application program) is executed, the processor 120 may display a user interface related to the application.

In operation 1103, the processor 120 may identify directivity information related to the user interface. The processor 120 may identify whether a user input required in the displayed user interface has directivity. For example, when the displayed user interface is related to whether a call is connected, the processor 120 may use the directivity information to identify information on at least one of directivity information, whether the user input having directivity is required, a direction of the user input, and a position at which the user input is required.

In operation 1105, the processor 120 may identify a directivity vibration pattern, based on the directivity information. The directivity vibration pattern may include a vibration pattern of a vibration device which operates to provide a directivity haptic. For example, when the directivity haptic is a vibration of a direction from left to right, the directivity vibration pattern may be a vibration pattern of a vibration device for providing a vibration of a direction from left to right. Descriptions regarding the vibration device or the directivity vibration pattern may refer to FIG. 2A to FIG. 5.

In various embodiments, the directivity vibration pattern for providing the directivity haptic may be pre-designated. For example, a memory of the electronic device 101 may include information on the vibration pattern of the vibration device to provide the directivity haptic. The processor 120 may identify information on the directivity vibration pattern to provide a vibration having directivity corresponding to a user's input direction, based on directivity information related to the user input.

In operation 1107, the processor 120 may provide a directivity haptic. The processor 120 may control the vibration device to operate, based on the identified directivity vibration pattern. The processor 120 may provide a vibration indicating a specific direction by controlling an operation of the vibration device.

In various embodiments, the vibration indicating the specific direction may be provided to induce a user to provide an input in a specific direction. Optionally, the directivity haptic which induces the user to provide an input (or a swipe input) indicating a specific direction may be referred to as an affordance.

In operation 1109, the processor 120 may receive a user input related to the directivity haptic. The processor 120 may detect a swipe input indicating a direction corresponding to a direction of the directivity haptic. For example, in response to a case where the directivity haptic is a vibration of a direction from left to right on a display, a user's input may also be a swipe input of a direction from left to right.

In operation 1111, the processor 120 may display another user interface corresponding to the user's input. The processor 120 may detect the user's input to change (or switch) content being displayed (e.g., a user interface displayed in operation 1101) to another content (e.g., a user interface of operation 1111).

Figure 12:
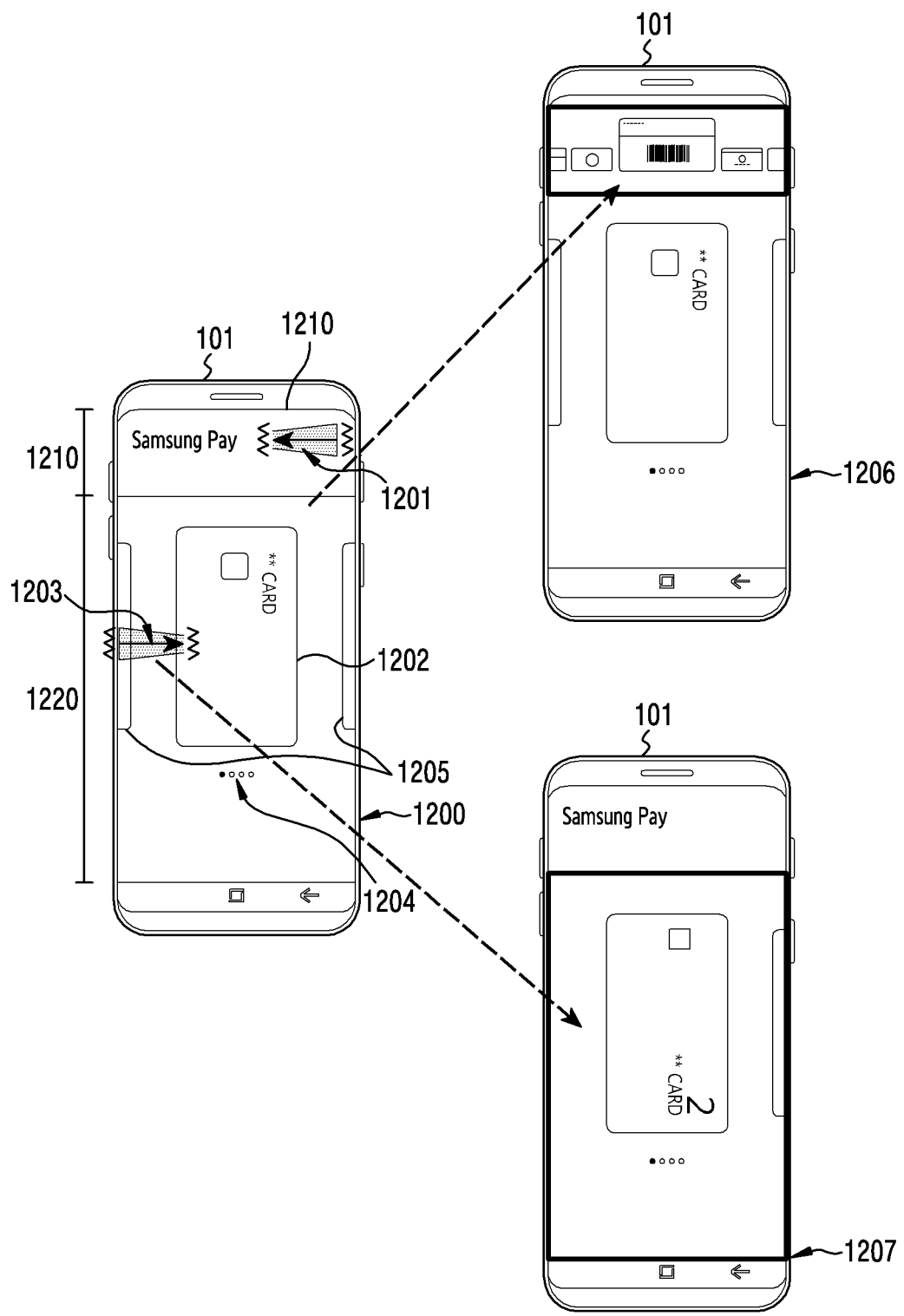
FIG. 12 illustrates an example of a user interface for providing a vibration having directivity related to the user interface according to various embodiments.

FIG. 12 illustrates an example of a user interface for providing a vibration having directivity related to the user interface according to various embodiments.

Referring to FIG. 12, the processor 120 may display a User Interface (UI) 1200. In various embodiments, the UI 1200 may include a user interface of an application (or a payment application) related to payment. The UI 1200 may include a first part 1210 and a second part 1220. The first part 1210 may include a sub-region in which information on at least one of a payment application name, an advertisement, a coupon, and event can be displayed. The second part 1220 may include a main-region of the payment application, in which a payment mean 1202 can be displayed. If there are a plurality of payment means, the second part 1220 may indicate the number of payment means through an icon 1204.

In various embodiments, the processor 120 may identify the UI 1200 to identify directivity information related to the UI 1200. The processor 120 may identify the first part 1210 or second part 1220 of the UI 1200 to identify directivity information for each of the first part 1210 and the second part 1220.

Although not shown, in various embodiments, the UI 1220 may include an icon, list, or content for selecting the first part 1210 or the second part 1220. The processor 120 may identify information related to the detected part, based on detecting of a user's input for selecting one of the first part 1210 and the second part 1220.

In various embodiments, the processor 120 may identify the first part 1210 to determine whether an available membership card is stored. If the available membership card is stored, the processor 120 may identify directivity information for displaying the membership card. The processor 120 may determine a directivity vibration pattern, based on the identified directivity information, to provide a directivity haptic 1201.

In various embodiments, the processor 120 may identify the second part 1220 to determine whether a plurality of payment means are stored. If the plurality of payment means are stored, the processor 120 may identify directivity information for displaying a payment mean currently being displayed and at least one of other payment means 1205. The processor 120 may provide a directivity haptic 1203, based on the identified directivity information.

In various embodiments, the processor 120 may identify the UI 1200 as a whole to identify directivity information included in the UI 1200. If the identified directivity information is information on a plurality of user inputs, the processor 120 may provide a plurality of directivity haptics on the basis of the directivity information. In an embodiment, a plurality of directivity haptics may be provided sequentially, or simultaneously, or regardless of order.

In various embodiments, the processor 120 may identify directivity information, based on a location of the electronic device 101, communication information, or the like, in a state where the UI 1200 is displayed. For example, in the state where the UI 1200 is displayed, the processor 120 may identify the location of the electronic device 101. If the identified location is a shop, the processor 120 may identify information on a membership card of the shop or a credit card (a payment means) recommended by the shop. If the membership card of the shop is stored in the memory 130 of the electronic device 101, the processor 120 may provide the directivity haptic 1201 for displaying the membership card. If information on a user's credit card corresponding to the credit card recommended by the shop is stored in the memory 130 of the electronic device 101, the processor 120 may provide a directivity haptic 1203 for displaying the credit card.

In various embodiments, by detecting a swipe input of a direction indicated by the directivity haptic 1201, the processor 120 may display a UI 1206 in which the first part 1201 is displayed with change. The first part 1210 may include information on the membership card on the shop in which the electronic device 101 is located.

In various embodiments, by detecting a swipe input of a direct indicted by the directivity haptic 1203, the processor 120 may display a UI 1207 in which the second part 1220 is displayed with change. The second part 1220 may include information on a user's credit card corresponding to the credit card recommended by the shop in which the electronic device 101 is located.

Figure 13:
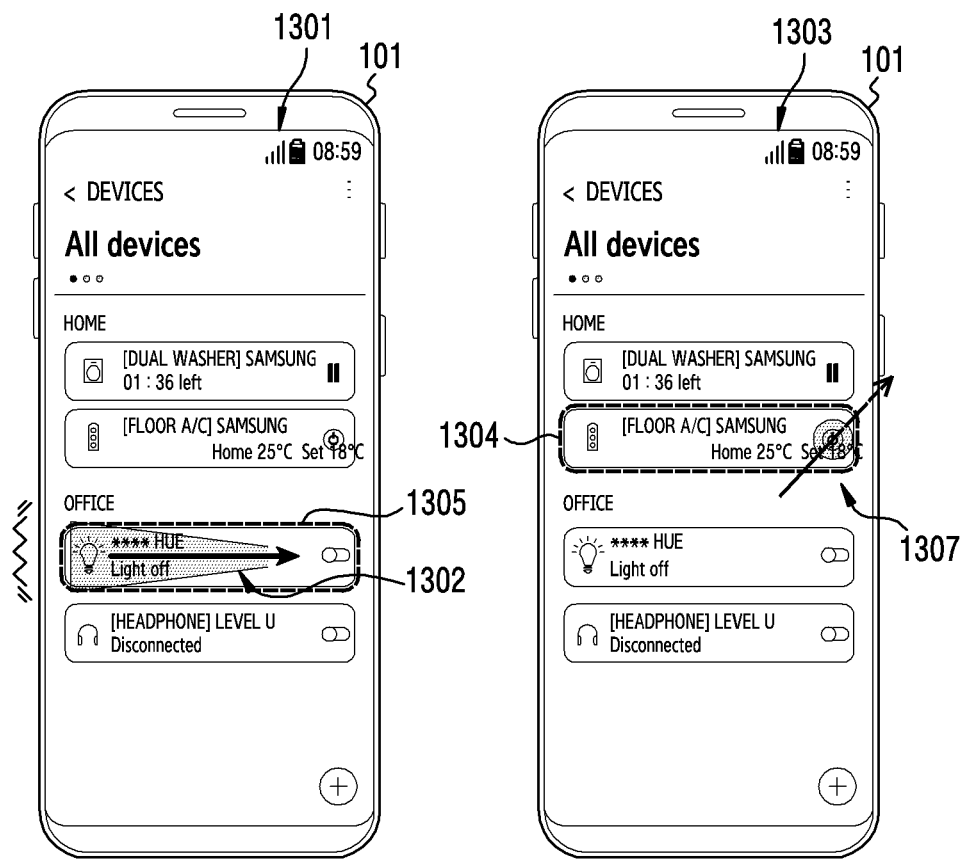
FIG. 13 illustrates another example of a user interface for providing a vibration having directivity related to a user interface according to various embodiments.

FIG. 13 illustrates another example of a user interface for providing a vibration having directivity related to a user interface according to various embodiments.

In various embodiments, the processor 120 may be coupled with a different electronic device based on Internet of things to transmit/receive information with respect to the different electronic device. The processor 120 may receive information on a user's usage pattern for the different electronic device from the coupled different electronic device. For example, the information on the user's usage pattern may include at least one of information on a time at which a user turns on/off office light or home light, information on a time at which the user arrives home, and information on an ambient temperature when the user turns on an air conditioner. Information on a user's device usage may include a variety of information on a user's device usage related to a device based on Internet of things, and is not limited to the aforementioned example.

In various embodiments, the processor 120 may identify whether there is directivity information related to a displayed UI 1301. The directivity information may include at least one of information on whether a user input having directivity is required in content 1305 included in the UI 1301, information on a direction of the user input, and information on a location at which the user input is received in the UI 1301.

In various embodiments, in the presence of directivity information related to a user interface, the processor 120 may provide a directivity haptic, based on information on a situation or the like. The information on the situation may include, for example, information on a time at which office light is turned on/off. For another example, the information on the situation may include information on a temperature when an air condition is turned on. In an embodiment, the processor 120 may identify the content 1305 requiring a swipe input and identify a situation related to the content 1305, thereby providing a directivity haptic 1302. For example, for the content 1305 included in the UI 1301, if a current time is 6:00 p.m., the processor 120 may provide a directivity haptic of a direction from right to left.

In various embodiments, the processor 120 may identify whether there is information related to a displayed UI 1303. Directivity information may be information on whether an input indicating a direction is required in content 1304 included in the UI 1303. In an embodiment, the processor 120 may identify content 1304 requiring an input as if a pressure is applied and information on a situation to provide a directivity haptic 1307. For example, regarding the content 1304 included in the UI 1303, if a home temperature is 26 degrees Celsius, the processor 120 may provide the directivity haptic 1307 of a direction as if a button is pressed, i.e., a z-axis direction.

Figure 14:
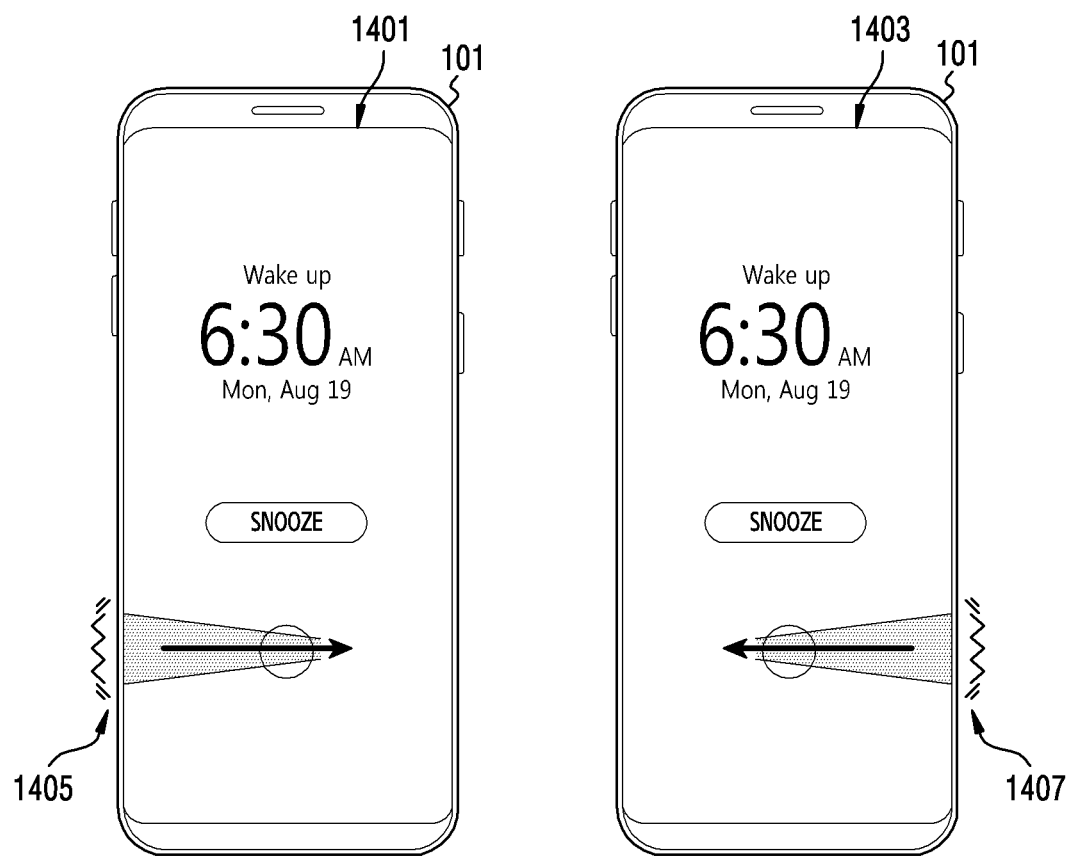
FIG. 14 illustrates another example of a user interface for providing a vibration having directivity related to the user interface according to various embodiments.

FIG. 14 illustrates another example of a user interface for providing a vibration having directivity related to the user interface according to various embodiments.

Referring to FIG. 14, the processor 120 may display a user interface (e.g., a UI 1401 or a UI 1403) related to an alarm application. In some embodiments, upon displaying the UI 1401 or 1403 related to the alarm application, the processor 120 may provide a directivity haptic (e.g., a directivity haptic 1405 or a directivity haptic 1407) for inducing a user input.

In various embodiments, upon receiving a user's swipe input corresponding to a direction indicated by the directivity haptic 1405 or 1407, the processor 120 may release the alarm.

In various embodiments, the processor 120 may randomly provide the directivity haptic 1405 or 1407 in response to a case where a user interface related to execution of the alarm is displayed. Upon receiving a swipe input of any direction, the processor 120 may release the alarm.

Figure 15:
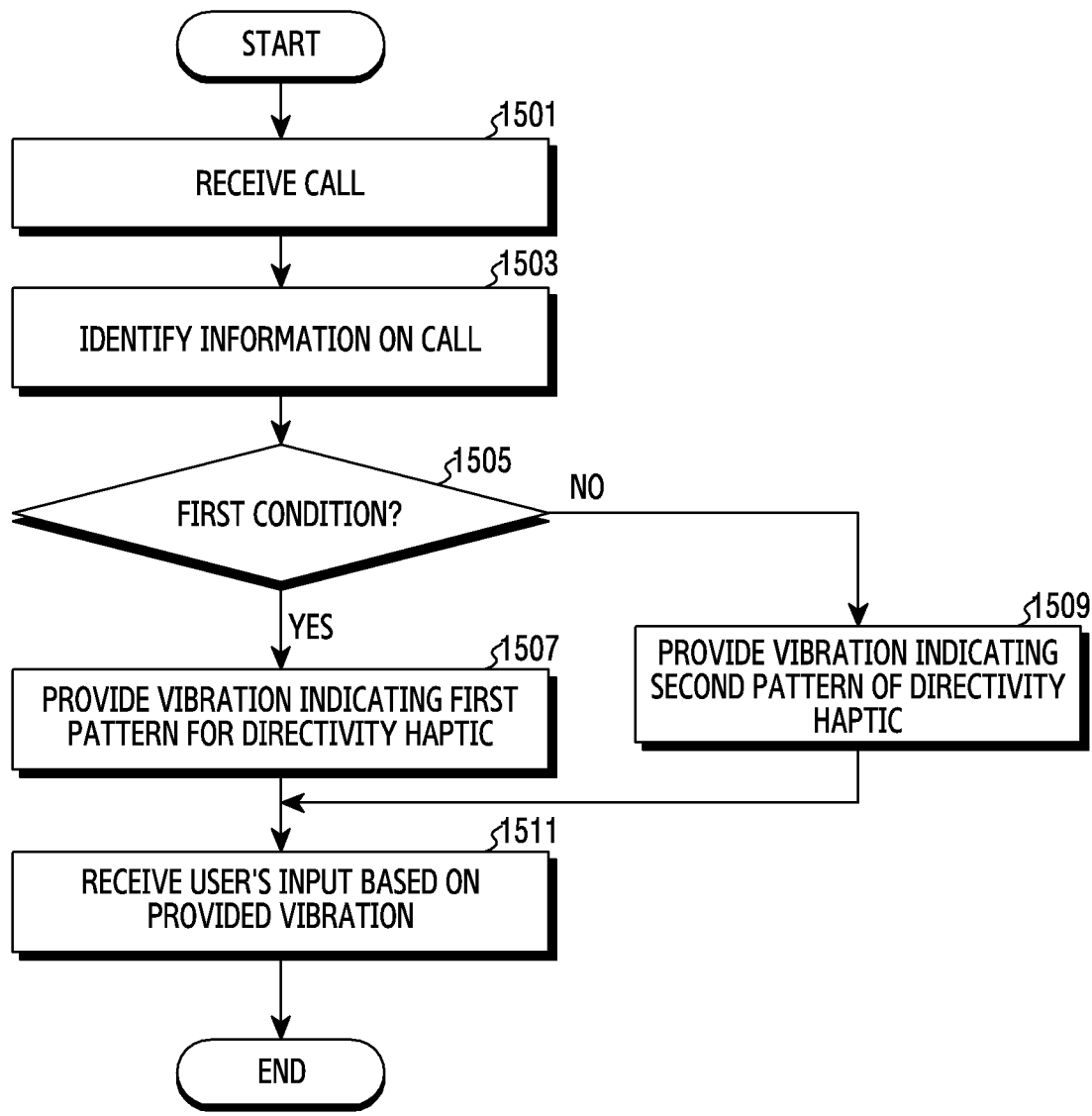
FIG. 15 illustrates an example of operating an electronic device for providing a vibration having directivity related to call reception according to various embodiments.

FIG. 15 illustrates an example of operating an electronic device for providing a vibration having directivity related to call reception according to various embodiments.

Referring to FIG. 15, in operation 1501, the processor 120 may receive a call. The processor 120 may receive a signal (e.g., a call) to connect a call from an external electronic device.

In operation 1503, the processor 120 may identify information on the call. The processor 120 may identify outgoing information of the received call. The processor 120 may include a phone number, name, and image of the external electronic device which originates the call. The processor 120 may search the outgoing information from the memory 130.

In operation 1505, the processor 120 may determine whether it corresponds to a first condition. The first condition may be a condition related to identifying of the call. For example, the first condition may include whether outgoing information is reliable. If the outgoing information is pre-stored in the electronic device 101, the processor 120 may determine that the first condition is satisfied. If the first condition is satisfied, the processor 120 may perform operation 1507. If the first condition is not satisfied, the processor 120 may perform operation 1509.

In operation 1507, the processor 120 may provide a vibration indicating a first pattern of a directivity pattern. The first pattern may be an operating pattern (or a directivity vibration pattern) of a vibration device for inducing a user's input to connect a call. For example, the first pattern may be a pattern indicating a direction for moving a call connecting icon to connect a call. For example, the first pattern may be a pattern of a direction from left to right or a pattern of a direction from right to left. In an embodiment, the processor 120 may display content indicating outgoing information while providing the first pattern.

In operation 1509, the processor 120 may provide a vibration indicating a second pattern of the directivity haptic. The second pattern may be an operating pattern of the vibration device for inducing a user's input for blocking a call. For example, the second pattern may be a pattern indicating a direction for moving a call terminating icon to block the call. The second pattern may be a pattern of a direction opposite to that of the first pattern. For example, the second pattern may be a pattern of a direction from right to left or a pattern of a direction from left to right. In some embodiments, if the first pattern is a pattern of a direction from right to left, the second pattern may be a pattern of a direction from left to right. In some other embodiments, if the first pattern is a pattern of a direction from left to right, the second pattern may be a pattern of a direction from right to left.

In various embodiments, the processor 120 may display content indicating a warning together with providing of the second pattern. Descriptions regarding the vibration device or the operating pattern may refer to FIG. 2A to FIG. 5.

In operation 1511, the processor 120 may receive a user's input based on a provided vibration. In some embodiments, if the provided vibration is a vibration indicating the first pattern, the processor 120 may receive a user's input corresponding to a direction induced by the first pattern. The received user's input may include an input for connecting a call. In some other embodiments, if the provided vibration is a vibration indicating the second pattern, the processor 120 may receive a user's input corresponding to a direction induced by the second pattern. The received user's input may include an input for blocking a call.

In various embodiments, the processor 120 may connect a call (or initiate a call with another electronic device), in response to detecting of a user's input corresponding to a direction induced by the first pattern. The processor 120 may reject the call (or reject a connection with the call with another electronic device), in response to detecting of a user's input corresponding to a direction induced by the second pattern.

Figure 16:
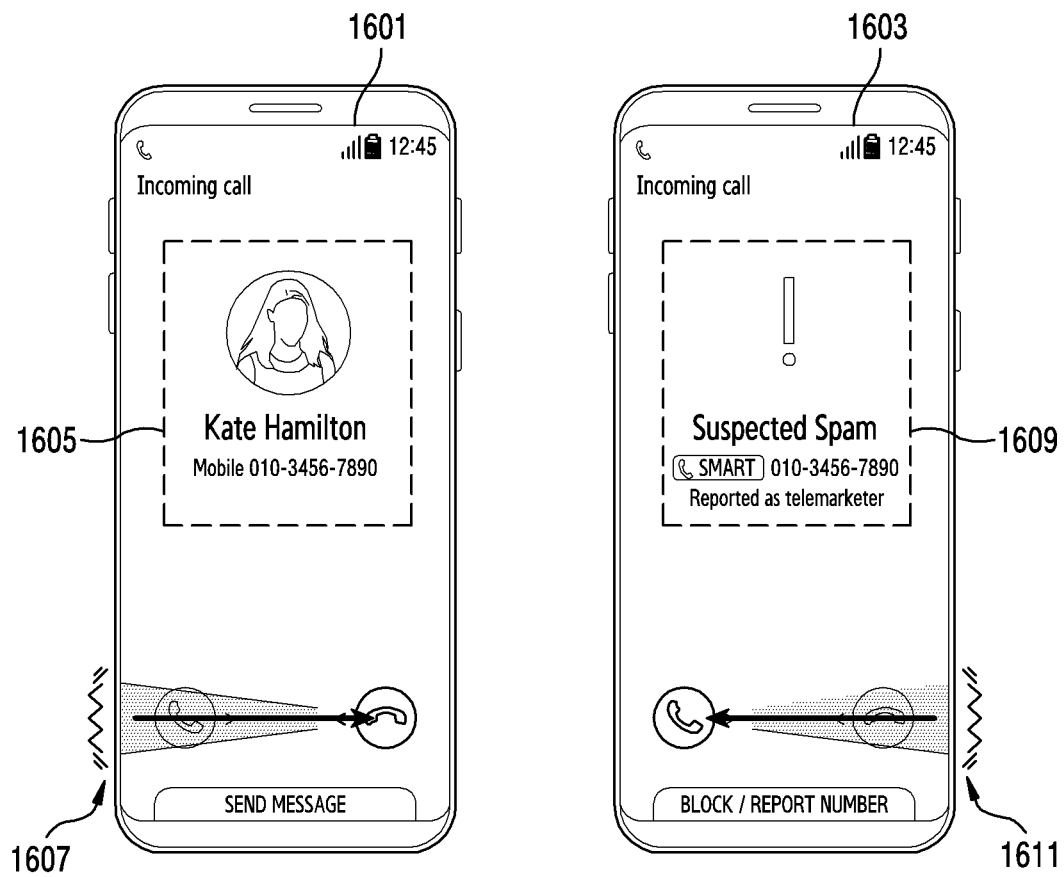
FIG. 16 illustrates an example of a user interface for providing a vibration having directivity related to call reception according to various embodiments.

FIG. 16 illustrates an example of a user interface for providing a vibration having directivity related to call reception according to various embodiments. Referring to FIG. 16, upon receiving a call from an external electronic device, the processor 120 may display information on the call.

In various embodiments, a UI 1601 may be displayed upon determining that outgoing information of the received call is reliable. The UI 1601 may include content 1605 of the received call. The content 1605 may include the outgoing information of the received call. The processor 120 may provide a directivity call for inducing call reception, together with displaying of the UI 1601. For example, the directivity haptic may include a vibration for providing a feeling as if a vibration point moves from left to right, in order to induce a swipe of a call icon from left to right.

In various embodiments, a UI 1603 may be displayed upon determining that the outgoing information of the received call is unreliable. The UI 1603 may include content 1609 to warn that the received call is a spam. The processor 120 may provide a directivity haptic for inducing terminating (or blocking) of the call, together with providing of the content 1609. For example, the directivity haptic may include a vibration for providing a feeling as if a vibration point moves from right to left, in order to induce a swipe of a call icon from right to left.

Figure 17:
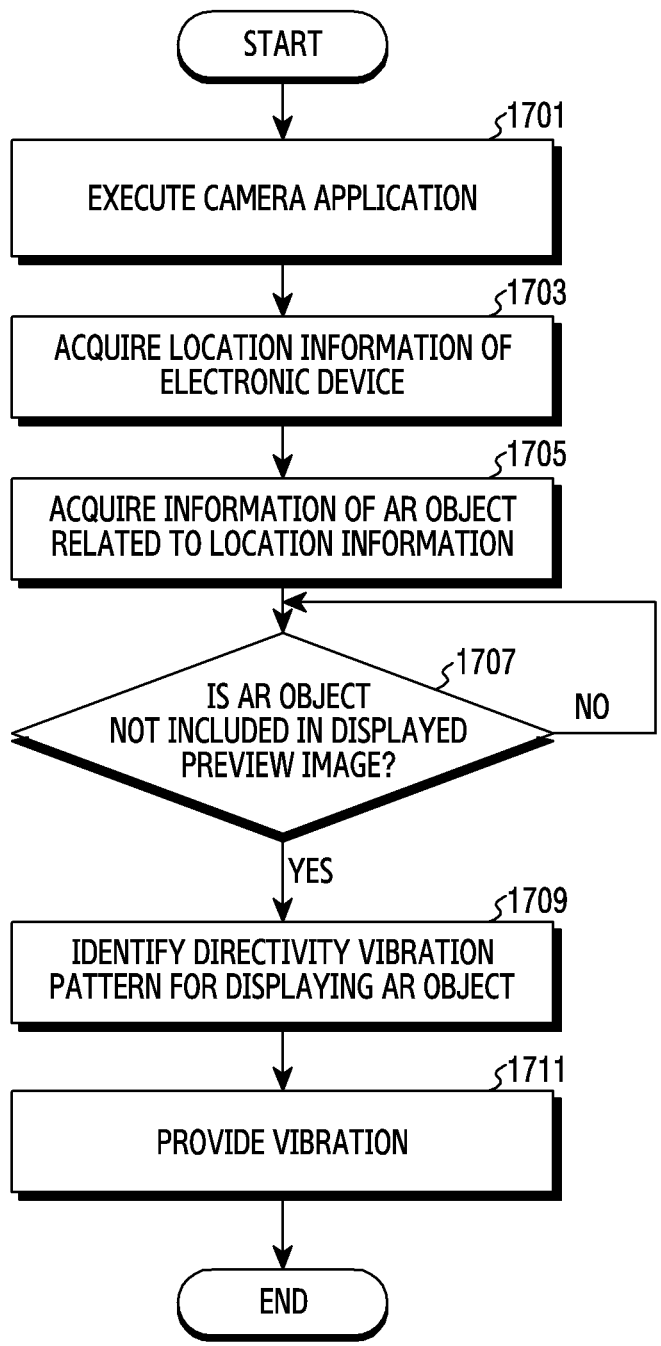
FIG. 17 illustrates an example of an operation of an electronic device for providing a vibration having directivity related to displaying of an AR object according to various embodiments.

FIG. 17 illustrates an example of an operation of an electronic device for providing a vibration having directivity related to displaying of an AR object according to various embodiments.

Referring to FIG. 17, in operation 1701, the processor 120 may execute a camera application. The processor 120 may execute the camera application, in response to detecting of a user's input for executing the camera application. The processor 120 may acquire a preview image via a camera (e.g., the camera module 180), in response to executing of the camera application.

In operation 1703, the processor 120 may acquire location information of the electronic device 101. The processor 120 may identify the location of the electronic device 101 via a GPS, in response to executing of the camera application.

In operation 1705, the processor 120 may acquire information of an AR object related to the location information. The processor 120 may acquire the information of the AR object located close to the electronic device 101 from another electronic device (e.g., a server). The information of the AR object may include information on the location of the AR object.

In operation 1707, the processor 120 may identify whether the AR object is included in a displayed preview image. The processor 120 may identify whether the AR object is included on the preview image, based on the information of the AR object. The processor 120 may perform operation 1709 if the AR object is not included on the preview image, and may repeat operation 1707 if the AR object is displayed.

In operation 1709, the processor 120 may identify a pattern of a directivity haptic (or a directivity vibration pattern) for displaying the AR object. The processor 120 may determine a moving direction of the electronic device 101 toward the location of the AR object, based on comparing the location of the AR object and the location of the electronic device 101. The processor 120 may identify the pattern of the directivity haptic indicating the moving direction of the electronic device 101. Descriptions regarding the vibration device or the operating pattern may refer to FIG. 2A to FIG. 5.

In operation 1711, the processor 120 may provide a vibration by using the pattern. The processor 120 may operate the vibration device, based on the pattern of the directivity haptic, to provide the vibration having directivity. The processor 120 may provide a vibration for inducing a movement of the electronic device 101 to display the AR object on the preview image.

In various embodiments, the provided vibration may induce a user to move the electronic device 101. The electronic device 101 may acquire the preview image at a movement location to display an AR object related to the movement location on the preview image.

Figure 18:
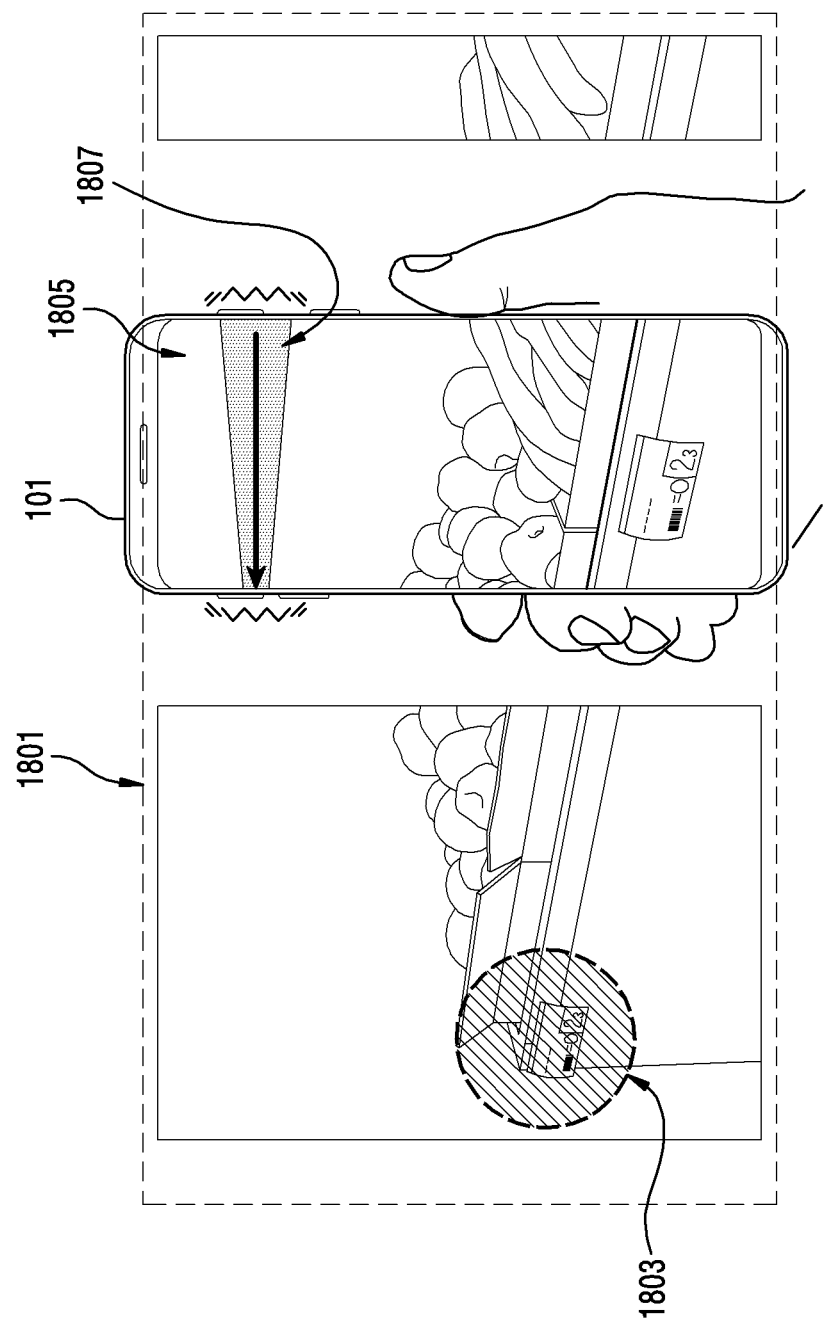
FIG. 18 illustrates an example of a user interface for providing a vibration having directivity related to displaying of an AR object according to various embodiments.

FIG. 18 illustrates an example of a user interface for providing a vibration having directivity related to displaying of an AR object according to various embodiments.

Referring to FIG. 18, the electronic device 101 may execute a camera application to acquire a preview image 1805 via a camera. In various embodiments, the processor 120 may identify an object included in the acquired preview image to display an AR object for the identified object.

In various embodiments, an object for displaying the AR object may not be included in the preview image 1805. In this case, the processor 120 may provide a directivity haptic 1807 for inducing a location movement of the electronic device 101 to display the AR object.

In various embodiments, the processor 120 may identify the location of the electronic device 101, together with execution of the camera application. Since the electronic device 101 identifies the location, the processor 120 may acquire location information for at least one AR object 1803 in the vicinity of the electronic device 101 from another electronic device. Based on the acquired information, the processor 120 may provide the directivity haptic 1807 so that the electronic device 101 moves to a location at which the AR object 1803 can be displayed.

In various embodiments, the electronic device 101 may include a plurality of cameras. A preview image displayed via the electronic device 101 may be a part of the preview image acquired via a plurality of cameras. The AR object 1803 may be included in a preview image not displayed. In this case, the processor 120 may identify the preview image acquired via the plurality of cameras to identify a moving direction of the electronic device 101 for displaying the AR object 1803. The processor 120 may provide a directivity haptic indicating the identified moving direction.

In various embodiments, by providing the directivity haptic 1807, the electronic device 101 may move to a location at which the AR object can be acquired by a user of the electronic device 101. For example, if the AR object 1803 is located on a left side of the electronic device 101, the electronic device 101 may move to left by the user.

Figure 19:
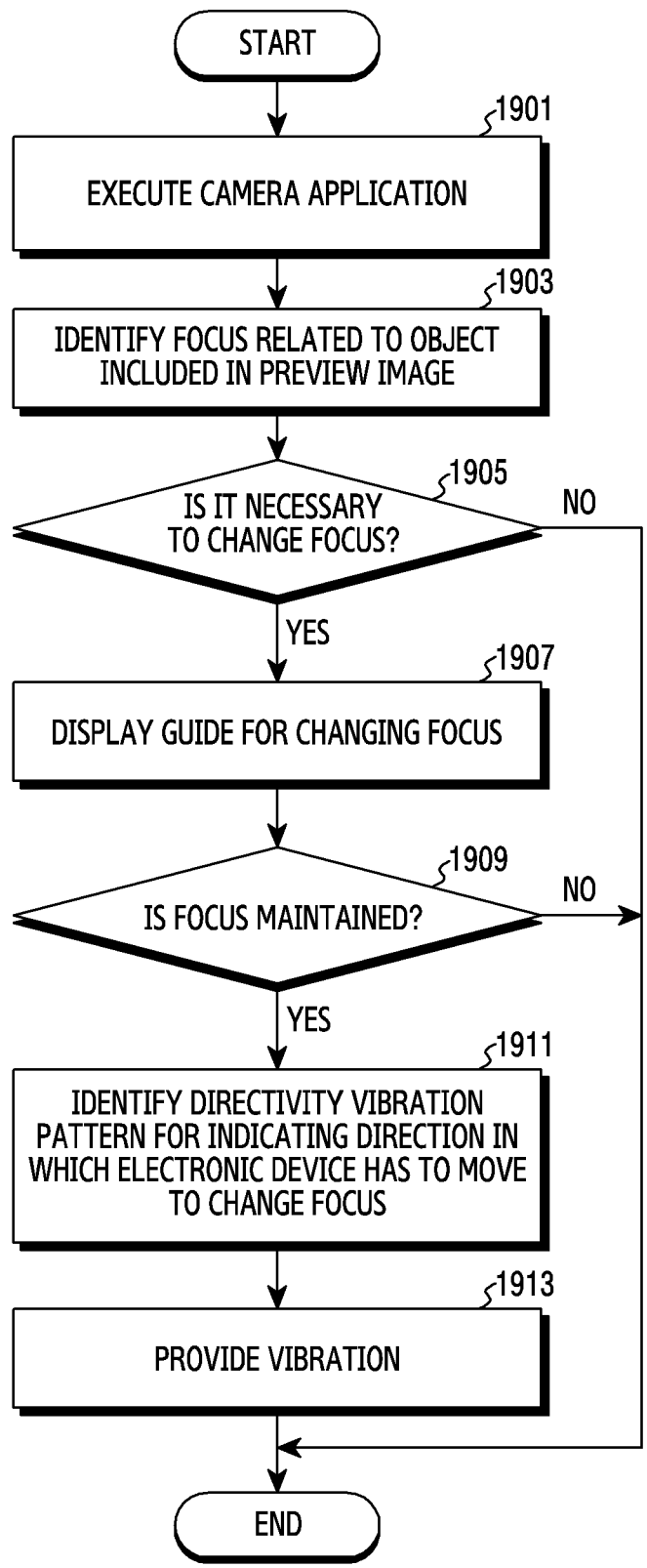
FIG. 19 illustrates an operation of an electronic device for providing a vibration having directivity related to acquiring of an image according to various embodiments.

FIG. 19 illustrates an operation of an electronic device for providing a vibration having directivity related to acquiring of an image according to various embodiments.

Referring to FIG. 19, in operation 1901, the processor 120 may execute a camera application. In various embodiments, operation 1901 may correspond to operation 1701 of FIG. 17.

In operation 1903, the processor 120 may identify a focus related to an object included in a preview image. In various embodiments, the processor 120 may identify an object included in the preview image. Through the identification of the object, the processor 120 may identify whether the identified object will be in focus.

In operation 1905, the processor 120 may determine whether it is necessary to change the focus. In some embodiments, if the object is out of focus, the processor 120 may determine that there is a need to change to the focus. In this case, the processor 120 may perform operation 1907. Although not shown, optionally, the processor 120 may perform operation 1911. In some other embodiments, if the object is out of focus, the processor 120 may determine that there is no need to change the focus. In this case, the processor 120 may end an operation related to the changing of the focus.

In operation 1907, the processor 120 may display a guide for changing the focus. For example, the processor 120 may display a text which requires a focus change on a preview image.

In operation 1909, the processor 120 may determine whether a focus related to the object is maintained. For example, the processor 120 may identify whether the identified object is in focus. For another example, in order to move the focus, the processor 120 may identify whether the electronic device 101 moves. In some embodiments, if the focus is not changed, the processor 120 may perform operation 1911. In some other embodiments, if the focus is not maintained, the processor 120 may end the operation. A case where the focus is not maintained may include at least one of a case where the object is in focus or a case where a movement of the electronic device 101 is detected.

In operation 1911, the processor 120 may identify a pattern of a directivity haptic for indicating a direction in which the electronic device 101 has to move to change the focus. The pattern of the directivity haptic may include a directivity vibration pattern of a vibration device for indicating a specific direction. The pattern related to the moving direction of the electronic device 101 may be pre-designated. The processor 120 may identify the pattern corresponding to the moving direction, in response to identifying of the direction in which the electronic device 101 moves. Descriptions regarding the vibration device or the operating pattern may refer to FIG. 2A to FIG. 5.

In operation 1913, the processor 120 may provide a vibration by using the pattern. The processor 120 may operate the vibration device according to the pattern to provide a directivity haptic for inducing a movement of the electronic device 101.

In various embodiments, the processor 120 may provide a directivity haptic for indicating a direction in which the electronic device 101 moves, together with displaying of a guide for a focus change.

Figure 20:
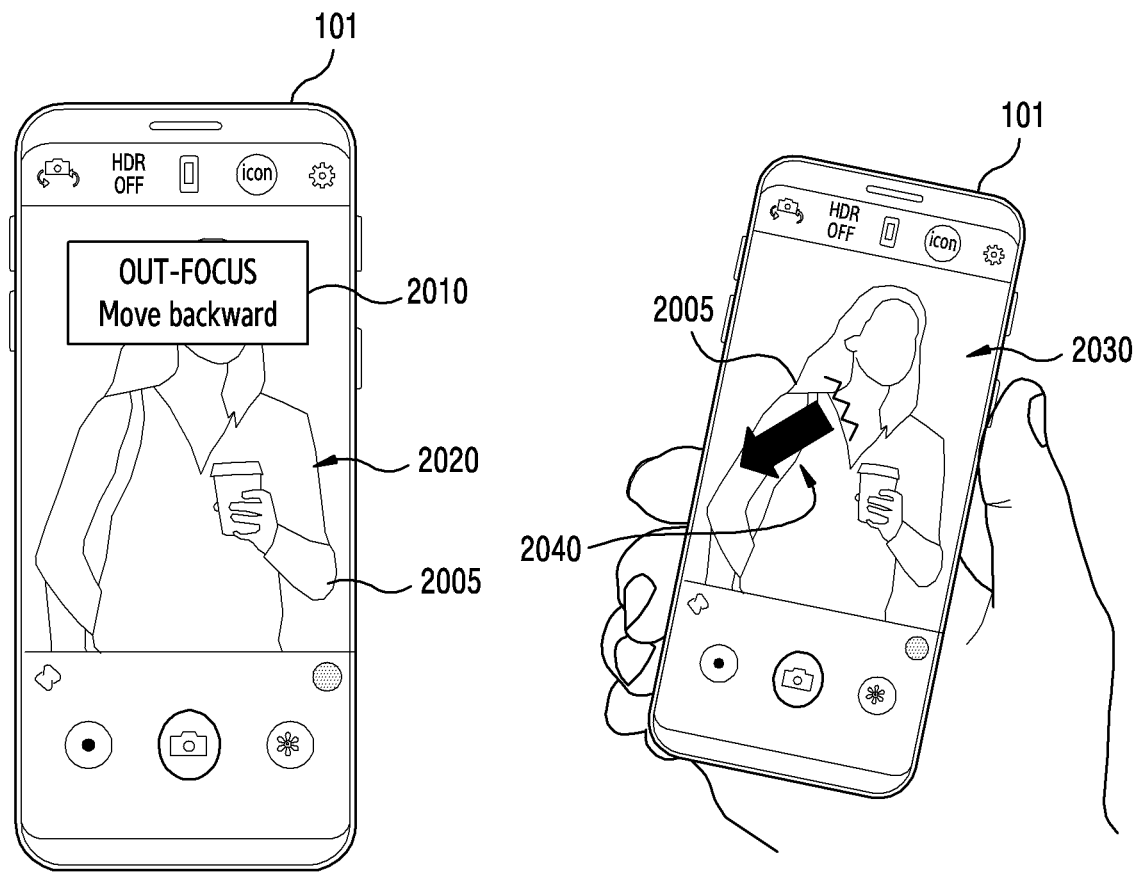
FIG. 20 illustrates an example of a user interface for providing a vibration having directivity related to acquiring of an image according to various embodiments.

FIG. 20 illustrates an example of a user interface for providing a vibration having directivity related to acquiring of an image according to various embodiments.

In various embodiments, based on executing of a camera application, the processor 120 may display a UI 2020 for a preview image acquired via a camera. In response to a case where an object 2005 is out of focus, the UI 2020 may include a text 2010 for guiding a movement of the electronic device 101. According to an embodiment, if the movement of the electronic device 101 is not detected for a specific time even if the text 2010 is displayed, the processor 120 may change the UI 2020 to a UI 2030, and may provide a directivity haptic 2040 indicating a moving direction of the electronic device 101.

In various embodiments, based on executing of the camera application, the processor 120 may provide the directivity haptic 2040 if the object 2005 included in the UI 2030 is out of focus. The directivity haptic may indicate a moving direction of the electronic device 1010 for adjusting a distance between the electronic device 101 and the object 2005. The moving direction of the electronic device 101 may include a direction for a z-axis. For example, the moving direction of the electronic device 101 may include a direction of moving the electronic device 101 backward or a direction of moving the electronic device 101 forward.

Figure 21:
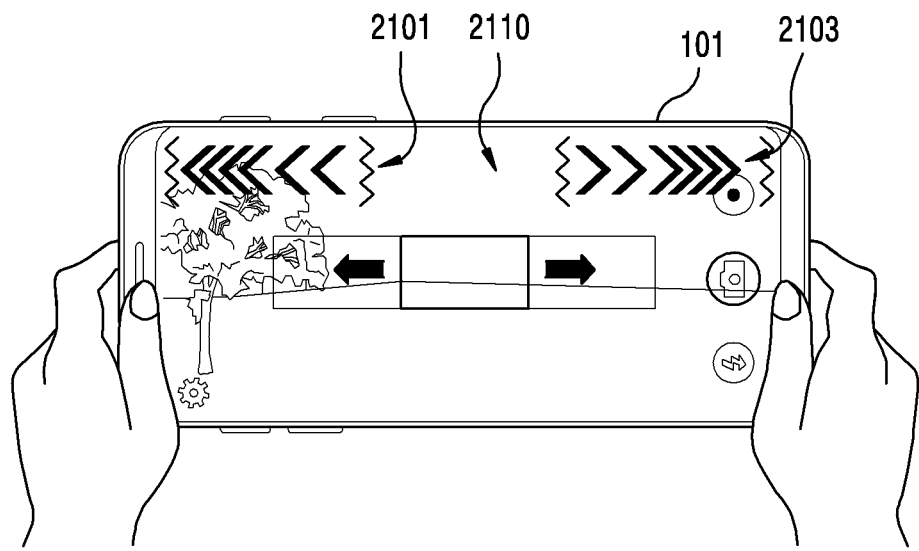
FIG. 21 illustrates another example of a user interface for providing a vibration having directivity related to acquiring of an image according to various embodiments.

FIG. 21 illustrates another example of a user interface for providing a vibration having directivity related to acquiring of an image according to various embodiments.

Referring to FIG. 21, the processor 120 may display a UI 2110 including a preview image for a panorama capture. Upon entering a panorama capture mode, the processor 120 may provide a vibration having moving directivity (or a directivity haptic) of the electronic device 101 for acquiring a panorama image. The directivity haptic may be a vibration for providing a feeling as if the electronic device 101 is pushed. The directivity haptic may include, for example, a directivity haptic 2101 providing a feeling as if the electronic device 101 is pushed to left or a directivity haptic 2103 providing a feeling as if the electronic device 101 is pushed to right. Through providing of the directivity haptic, the processor 120 may induce a user of the electronic device 101 to move the electronic device 101.

Although not shown, the processor 120 may identify an image, which is being acquired, on a real-time basis, and thus may provide a directivity haptic for moving the electronic device 101 upward or downward when the image deviates from a central axis.

Figure 22:
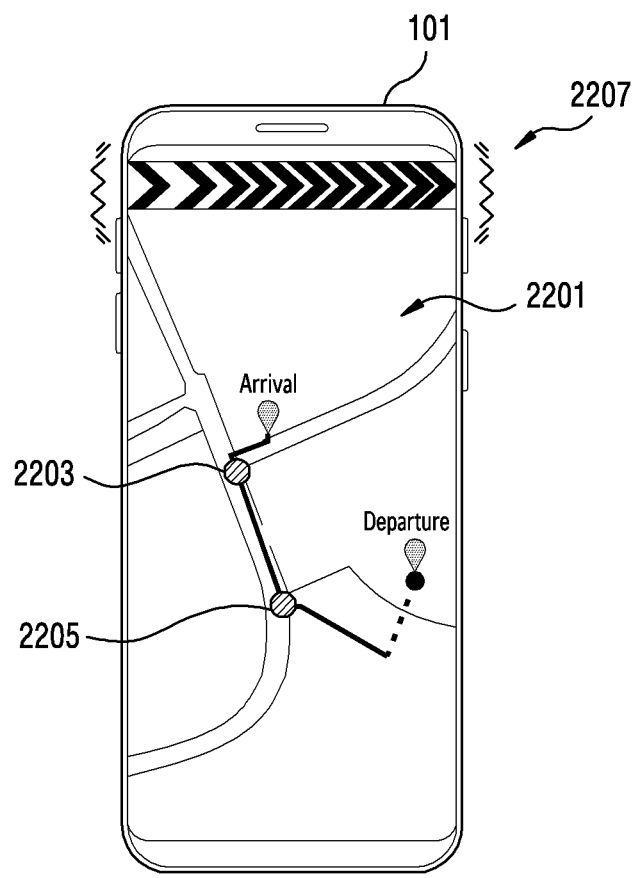
FIG. 22 illustrates an example of a user interface for providing a vibration having moving directivity of an electronic device according to various embodiments.

FIG. 22 illustrates an example of a user interface for providing a vibration having moving directivity of an electronic device according to various embodiments. In various embodiments, a moving direction of the electronic device 101 may include a direction in which the electronic device moves.

Referring to FIG. 22, the processor 120 may execute a navigation application to provide a route guidance function. In a process of guiding a route from a departure point to an arrival point, the processor 120 may provide a directivity haptic for guiding a direction. A UI 2201 may be a user interface of the electronic device 101 in which the route guidance function is being executed. The processor 120 may identify a point 2203 or 2205 at which a direction is changed, based on the UI 2201 (or a navigation application). The processor 120 may identify a location of the electronic device 101, based on various communication systems such as GPS, Bluetooth, NFC, or the like. Upon identifying that the location of the electronic device 101 is a point at which a direction is changed, the processor 120 may provide a vibration (or a directivity haptic) 2207 having directivity.

In various embodiments, a direction of the directivity haptic may indicate a direction in which a user of the electronic device 101 has to move. For example, a moving direction of the electronic device 101 at the point 2205 or the point 2203 may be a right direction. In this case, to indicate a change of a direction, the processor 120 may provide the directivity haptic 2207 of a direction from left to right. The directivity haptic 2207 may include at least one of a vibration for providing a feeling as if the electronic device 101 is pushed in a right direction and a vibration as if a vibration point moves from right to left on a display.

Figure 23:
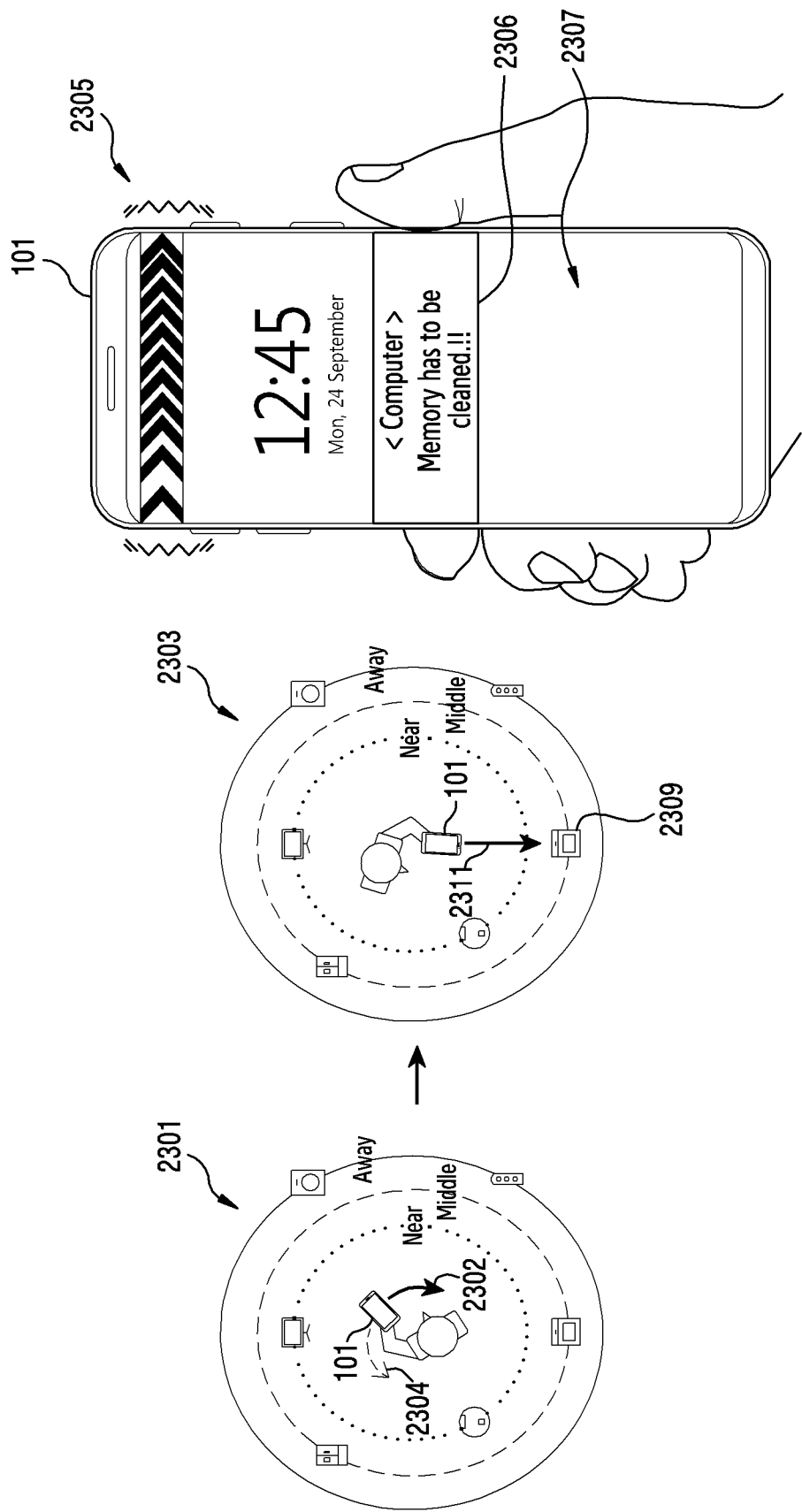
FIG. 23 illustrates an example of an operation of an electronic device for providing a vibration having directivity related to a location of an external device according to various embodiments.

FIG. 23 illustrates an example of an operation of an electronic device for providing a vibration having directivity related to a location of an external device according to various embodiments.

According to various embodiments, in a user environment 2301, the processor 120 of the electronic device 101 may be coupled with at least one external device. In this case, the processor 120 may receive information related to the external device. For example, a signal indicating that a computer included in the user environment 2301 requires memory cleaning may be received.

In various embodiments, upon receiving the signal for the external device, the processor 120 may identify a location of the external device. By comparing the identified location and the location of the electronic device 101, the processor 120 may provide a directivity haptic for guiding the location of the external device. For example, the directivity haptic may include a directivity haptic 2304 indicating a left direction or a directivity haptic 2302 indicating a right direction. Although not shown, the directivity haptic is not limited to the aforementioned example, and may include a vibration of various directions for indicating the location of the external device.

In various embodiments, the processor 120 may display content 2306 indicating a signal received in a UI 2307 of the electronic device 101. The processor 120 may provide a directivity haptic 2305 for indicating a location of an external device (e.g., a computer) at an upper end portion of the electronic device 101. The directivity haptic 2305 may correspond to the directivity haptic 2302.

In various embodiments, the user environment 2303 indicates an environment in which the electronic device 101 is moved by a user, based on providing of the directivity haptic 2302 or 2305. In an embodiment, if a distance between the electronic device 101 and the external device is greater than or equal to a designated distance, the processor 120 may provide a directivity haptic for guiding in a direction of approaching the external device.

Figure 24:
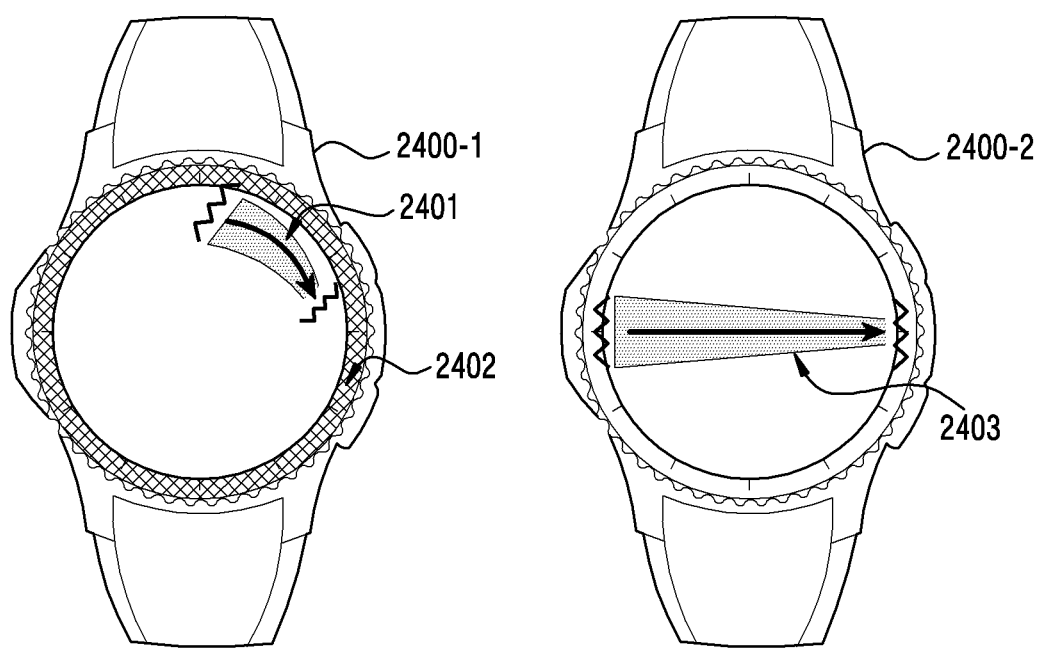
FIG. 24 illustrates an example of a user interface of a wearable device for providing a vibration having directivity according to various embodiments.

FIG. 24 illustrates an example of a user interface of a wearable device for providing a vibration having directivity according to various embodiments.

Referring to FIG. 24, a wearable device 2400-1 or 2400-2 may provide a directivity haptic for indicating a direction. In various embodiments, the wearable device 2400-1 may provide a directivity haptic 2401 for inducing a user to rotate a portion 2402 (e.g., a rotary, a rotational input module), which is configured in a rotatable manner, in a specific direction. For example, the wearable device 2400-1 may provide a directivity haptic 2401 indicating a rotation direction of the portion 2402 to induce execution of a payment application, in response to detecting of an event related to the payment application. The directivity haptic 2401 may include a vibration for providing a feeling as if a portion of the electronic device 101, i.e., the portion 2402, is pushed or a feeling as if a vibration point moves on a display.

In various embodiments, the wearable device 2400-2 may provide a directivity haptic, in response to receiving of an event indicating a direction. For example, a directivity haptic 2403 may be provided to induce a user's swipe input (e.g., a swipe input from left to right) for switching a screen, in response to receiving an event for switching the screen.

In various embodiments, a method of an electronic device may include detecting an event for a user's input related to a direction, identifying a vibration pattern having directivity for indicating the direction, and providing a vibration having the directivity, based on the vibration pattern.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

Various embodiments of the disclosure disclosed in the specification and the drawing are merely a specific example presented for clarity and are not intended to limit the scope of the disclosure. Therefore, in addition to the embodiments disclosed herein, various changes in forms and details made without departing from the technical concept of the disclosure will be construed as being included in the scope of the disclosure.

The invention claimed is:

1. An electronic device comprising:
   one or more vibration devices;
   a memory including instructions stored therein; and
   at least one processor,
   wherein the stored instructions are executable by the at least one processor to cause the electronic device to:
   detect an event requesting a user of the electronic device to provide a user input, wherein the user input relates to a prespecified direction;
   identify a vibration pattern including directivity corresponding to the prespecified direction of the requested user input; and
   before receiving the requested user input, drive the one or more vibration devices, based on the vibration pattern, as if a vibration point moves to the prespecified direction of the requested user input, so as to indicate the prespecified direction.

2. The electronic device of claim 1, further comprising a display,
   wherein the user input includes a motion of the user who moves a location of the electronic device in the prespecified direction or an input for moving a touch input from a first point to a second point on a surface of the display based on the prespecified direction.

3. The electronic device of claim 2, wherein the vibration pattern approximates pushing of the electronic device in the prespecified direction, when the user input includes the motion of the user.

4. The electronic device of claim 2, wherein the vibration pattern indicates the prespecified direction through a change in vibrational intensity for at least one of the one or more vibration devices, when the user input includes the input for moving the touch input from the first point to the second point on the surface of the display.

5. The electronic device of claim 1, wherein the event includes at least one of:
   receiving a signal requesting the user input, and
   detecting a request for the user input from an executing application.

6. The electronic device of claim 1, wherein the stored instructions are further executable by at least one processor to:
   identify whether the user input is required, based on at least one of location information, time information, a signal received from an external electronic device, and an executed application; and
   wherein the event is detected based on determining that the user input is required.

7. The electronic device of claim 1, wherein the stored instructions are further executable by the at least one processor to:
   receive a signal;
   identify the received signal, when the event is related to the received signal; and
   generate a vibration according to a first pattern, based on detecting that the identified signal corresponds to a first condition, and
   generate a vibration based on a second pattern different from the first pattern, based on detecting that the identified signal does not correspond to the first condition.

8. The electronic device of claim 1, further including a display displaying a user interface,
   wherein the stored instructions are further executable by the at least one processor to:
   in response to detecting that the event is related to the user interface, identify content that is mapped to the user input and included in the user interface; and
   generate a vibration including the directivity for a portion of the display in which the identified content is displayed within the user interface.

9. The electronic device of claim 1,
   wherein information on the vibration pattern is mapped to the prespecified direction and pre-stored in the memory, and
   wherein the stored instructions are further executable by the least one processor to identify the information on the vibration pattern based on identification of the prespecified direction and the mapping.

10. The electronic device of claim 9, wherein the information on the vibration pattern includes at least one of a vibration count, a vibration order, a vibration scheme, a vibration intensity, a vibration position, and a vibration interval.

11. A method of an electronic device, the method comprising:
    detecting, by at least one processor, an event requesting a user of the electronic device to provide a user input, wherein the user input relates to a prespecified direction;
    identify a vibration pattern stored in a memory including directivity corresponding to the prespecified direction of the requested user input; and
    before receiving the requested user input, driving one or more vibration devices, based on the vibration pattern, as if a vibration point moves to the prespecified direction of the requested user input, so as to indicate the prespecified direction.

12. The method of claim 11, wherein the user input includes a motion of the user who moves a location of the electronic device in the prespecified direction or an input for moving a touch input from a first point to a second point on a surface of a display based on the prespecified direction.

13. The method of claim 12, wherein the vibration pattern approximates pushing of the electronic device in the prespecified direction, when the user input includes the motion of the user, or
    wherein the vibration pattern indicates the prespecified direction through a change in vibrational intensity for at least one of the one or more vibration devices, when the user input includes the input for moving the touch input from the first point to the second point on the surface of the display.

14. The method of claim 11, further comprising:
    receiving a signal;

identify the received signal, when the event is related to the received signal; and generate a vibration according to a first pattern, based on detecting that the identified signal corresponds to a first condition, and generate a vibration based on a second pattern different from the first pattern, based on detecting that the identified signal does not correspond to the first condition.

15. The method of claim 11, further comprising:

in response to determining that the event is related to a user interface displayed on a display, identify content mapped to the user input and included in the user interface; and generating a vibration including the directivity for a portion of the display in which the identified content is displayed within the user interface.

* * * * *